(12) United States Patent
Kim et al.

(10) Patent No.: US 11,766,934 B1
(45) Date of Patent: Sep. 26, 2023

(54) FOLDABLE PEDAL APPARATUS FOR VEHICLE

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-Si (KR); Ji Soo Kim, Daegu (KR)

(73) Assignees: Hyundai Motor Company, Seoul (KR); Kia Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 17/981,275

(22) Filed: Nov. 4, 2022

(30) Foreign Application Priority Data

Jul. 18, 2022 (KR) ........................ 10-2022-0088440

(51) Int. Cl.
*G05G 1/40* (2008.04)
*B60K 26/02* (2006.01)
*B60T 7/06* (2006.01)

(52) U.S. Cl.
CPC ................ *B60K 26/02* (2013.01); *B60T 7/06* (2013.01); *B60K 2026/026* (2013.01)

(58) Field of Classification Search
CPC .. G05G 1/30; G05G 1/32; G05G 1/36; G05G 1/38; G05G 1/40; G05G 1/405; G05G 1/44; G05G 1/445; G05G 5/005; G05G 5/03; G05G 5/05; G05G 5/28; B60K 26/02; B60K 26/021; B60K 2026/026; B60K 2026/023; B60K 2026/022; B60T 7/04; B60T 7/06; B60T 7/065; B60R 21/09

See application file for complete search history.

(56) References Cited

U.S. PATENT DOCUMENTS

| | | | |
|---|---|---|---|
| 3,151,499 A * | 10/1964 | Roe ........................ | G05G 1/487 477/211 |
| 9,323,281 B2 * | 4/2016 | Byun ........................ | G05G 5/03 |
| 10,906,514 B1 * | 2/2021 | Kim ........................ | G05G 5/03 |
| 10,946,741 B1 * | 3/2021 | Kim ........................ | B60T 7/06 |
| 11,225,226 B1 * | 1/2022 | Kim ........................ | B60T 7/042 |
| 11,249,506 B1 * | 2/2022 | Kim ........................ | G05G 5/28 |
| 11,327,520 B1 * | 5/2022 | Kim ........................ | G05G 5/05 |
| 2004/0259687 A1 * | 12/2004 | Ritter ................... | B60K 26/021 477/187 |
| 2020/0317152 A1 * | 10/2020 | Ghaffari .................. | B60T 7/042 |
| 2022/0048384 A1 * | 2/2022 | Kim ........................ | G05G 5/28 |
| 2022/0055477 A1 * | 2/2022 | Kim ........................ | G05G 1/44 |
| 2023/0001788 A1 * | 1/2023 | Hariu ................... | B60K 26/021 |

FOREIGN PATENT DOCUMENTS

| | | | |
|---|---|---|---|
| KR | 10-2021-0125733 | 10/2021 | |
| KR | 10-2023-0096205 | 6/2023 | |
| WO | WO-2020180141 A1 * | 9/2020 | .............. B60T 7/042 |

* cited by examiner

*Primary Examiner* — Richard W Ridley
*Assistant Examiner* — Brian J McGovern
(74) *Attorney, Agent, or Firm* — MORGAN, LEWIS & BOCKIUS LLP

(57) ABSTRACT

A foldable pedal apparatus for a vehicle is configured so that a pedal pad is pop up in a manual driving mode in which a driver drives the vehicle himself or herself so that operation by the driver is possible, the pedal pad is hidden in an autonomous driving situation so that operation by the driver is impossible, and a gear device transmitting power of motors generates a boosting force to implement a foldable function of the pedal pad.

20 Claims, 18 Drawing Sheets

FOLDABLE PEDAL APPARATUS FOR VEHICLE

CROSS REFERENCE TO RELATED APPLICATION

The present application claims priority to Korean Patent Application No. 10-2022-0088440, filed Jul. 18, 2022, the entire contents of which is incorporated herein for all purposes by this reference.

BACKGROUND OF THE PRESENT DISCLOSURE

Field of the Present Disclosure

The present disclosure relates to a foldable pedal apparatus for a vehicle. The present disclosure relates to a foldable pedal apparatus for a vehicle, wherein, in a manual driving mode in which a driver drives the vehicle by himself or herself, a pedal pad protrudes toward the driver and is exposed thereto to allow the driver to operate the pedal pad by himself or herself, and in an autonomous driving situation, the pedal pad is hidden and is prevented from being exposed toward the driver to prevent operation by the driver.

Description of Related Art

The development of autonomous driving vehicles is progressing in the direction of smart vehicles with autonomous driving technology by which a vehicle may go its destination itself even when a driver does not manipulate a steering wheel, an accelerator pedal, and brakes.

When the autonomous driving situation is realized universally, the driver can select a mode among a manual driving mode in which the driver drives her or himself and an autonomous driving mode in which the vehicle goes its destination itself without direct driving of the driver.

In the autonomous driving mode, the driver can take rest while stretching his or her legs. Therefore, when a pedal (accelerator pedal and brake pedal) located in a lower space of a driver seat remains in an exposed state to the vehicle interior, there is a problem that the pedal disturbs the rest of the driver.

An autonomous driving situation refers to a situation in which the driver does not manipulate the pedal (accelerator pedal and brake pedal) of the vehicle. Therefore, when the driver manipulates the pedal during the autonomous driving, a vehicle controller determines that the driver stops the autonomous driving and wants to resume manual driving, and thereby stops the autonomous driving.

However, because the pedal of the vehicle is configured to be exposed to the lower space of the driver seat, in the autonomous driving situation, there is a risk that the driver inadvertently manipulates the pedal (mis-operation of pedal), and in the instant case, there is a risk that accidents may occur in response to traffic condition or the distance between vehicles.

Accordingly, there is necessity for technique development of a pedal apparatus, wherein, in the manual driving mode in which the driver drives her or himself, the pedal pad is exposed to protrude toward the driver so that manipulation by the driver is possible, and in the autonomous driving situation, exposure of a pedal pad is prevented so that the manipulation by the driver is impossible to secure safety and the driver's rest and to prevent mis-operation.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal apparatus for a vehicle, wherein the foldable pedal apparatus is configured such that, in a manual driving mode in which a driver drives the vehicle by himself or herself, a pedal pad protrudes toward the driver to be exposed (pop-up) so that the driver can operate the pedal apparatus, and in the autonomous driving situation, the pedal pad is hidden and exposure toward the driver is prevented (hidden) to prevent operation by the driver, and in the autonomous driving situation, the driver can take a comfortable rest, and moreover, mis-operation of the pedal apparatus in the autonomous driving situation is prevented, inducing safety improvement.

Furthermore, according to an exemplary embodiment of the present disclosure, the foldable pedal apparatus is configured to generate a boosting force by a gear device transmitting power of a motor to implement a foldable function of the pedal pad, so that Various aspects of the present disclosure are to induce cost reduction and size reduction with use of a minimum-capacity motor.

Furthermore, according to an exemplary embodiment of the present disclosure, the foldable pedal apparatus is configured to simplify the mechanism of the foldable function as much as possible to minimize the number of parts thereof, so that a further objective of the present disclosure is to induce cost reduction, weight reduction, and layout minimization.

Furthermore, according to an exemplary embodiment of the present disclosure, the foldable pedal apparatus is an organ type electric pedal apparatus including a high-load spring module and a hysteresis lever, so that a further objective of the present disclosure is to tune a step force, a stroke, and a hysteresis operation force required differently for each vehicle model through change of portions of the hysteresis lever, inducing cost reduction.

In an aspect of the present disclosure, there is provided a foldable pedal apparatus for a vehicle, the foldable pedal apparatus including: a pedal housing; a pedal pad rotatably coupled to the pedal housing and configured to move in response to operation of a driver; a spring module mounted on the pedal housing and configured to provide an elastic force to the pedal pad so that the pedal pad may protrude from the pedal housing; a gear device configured to rotate in receiving power of motors fixed to the pedal housing to generate a boosting force; and a rotation stopper coupled to the gear device, wherein when the pedal pad rotates forward and is inserted into the pedal housing as the rotation stopper presses the pedal pad by rotation of the gear device, the foldable pedal apparatus may be hidden so that an operation of the pedal pad by the driver in an autonomous driving mode may be impossible.

When pressure of the pedal pad by the rotation stopper is removed by rotation of the gear device and the pedal pad rotates rearward by the elastic force of the spring module to protrude from the pedal housing, the foldable pedal apparatus may be pop-up so that an operation of the pedal pad by the driver in a manual driving mode may be possible.

The pedal housing may include a side cover coupled thereto to cover an open one portion of the pedal housing; the side cover may have a cover groove interrupted with an inside space of the pedal housing; the motors and the gear device may be located inside the cover groove; and the rotation stopper may be provided to protrude to the inside space of the pedal housing through the side cover.

The foldable pedal apparatus may include a rubber stopper coupled to the pedal housing, wherein when the pedal pad rotates to protrude from the pedal housing, the rubber stopper is provided as a stopper by being in contact with the pedal pad.

The rubber stopper may include a first rubber stopper and a second rubber stopper securely coupled to an internal upper surface of the pedal housing; wherein the first rubber stopper may be coupled to a position closer to a rotation center portion of the pedal pad than the second rubber stopper, so when the pedal pad rotates to protrude from the pedal housing, the first rubber stopper may be brought into contact with the pedal pad first and the second rubber stopper may be brought into contact with the pedal pad later.

The first rubber stopper may have a hollow shape with an empty inside portion to be deformed in contact with the pedal pad to absorb shock and noise; and the second rubber stopper may have a solid shape with a filled inside portion to perform complete stop of the pedal pad.

The foldable pedal apparatus may include a hysteresis lever rotatably provided with respect to the pedal housing, and of which an upper portion may be inserted into the pedal pad and brought into contact with an inside surface of the pedal pad, and generating hysteresis by a friction force with the pedal pad when the pedal pad rotates.

The pedal pad may include: a box-shaped pad portion including a pad surface operated by a foot of the driver, provided so that one end portion of the spring module may be inserted thereinto, and brought into contact with the upper portion of the hysteresis lever inserted thereinto; and a pedal arm portion of which a first end portion may be connected to the pad portion and a second end portion may be coupled to a hinge pin.

In a hidden state of the pedal pad, and in switching from a pop-up state to the hidden state and switching from the hidden state to the pop-up state, the pedal arm portion and the rotation stopper may be brought into contact with each other.

In a pop-up state of the pedal pad and a state in which the pop-up pedal pad moves in response to operation of the driver and then rotates forward, contact between the pedal arm portion and the rotation stopper may be prevented.

The foldable pedal apparatus may include: a permanent magnet coupled to the pedal pad; and a printed circuit board (PCB) coupled to the pedal housing to face the permanent magnet, wherein when the pedal pad rotates, the PCB may detect magnetic flux change of the permanent magnet to generate a signal related to a pedal function.

When the pedal pad rotates to be hidden or pop-up by rotation of the gear device in response to operation of the motors and a position of the permanent magnet changes, the PCB may perform non-generation of the signal related to the pedal function to prevent mis-operation of the foldable pedal apparatus.

Only when the pedal pad is in a pop-up state in which the pedal pad protrudes from the pedal housing and a position of the permanent magnet changes as the pedal pad rotates forward by operation of the driver in non-operation of the motor, the PCB may generate the signal related to the pedal function.

The motors may be two-way rotational motors configured for rotating both clockwise and counterclockwise and include at least two motors.

The gear device may include: a first gear coupled to the motor; a second gear gear-engaged with the first gear; a third gear integrated with the second gear and rotating together with the second gear; and a fourth gear gear-engaged with the third gear and in which the rotation stopper may be coupled to a position eccentric from a rotation center portion of the fourth gear, wherein, to generate the boosting force in a process in which power of the motors is transmitted from the first gear to the fourth gear, the second gear may have the number of gear teeth greater than the number of gear teeth of the first gear and have a pitch circle diameter (PCD) formed greater than the first gear, and the fourth gear may have the number of gear teeth greater than the number of gear teeth of the third gear and have a PCD formed greater than the third gear; the third gear and the fourth gear may include a worm gear and a worm wheel gear; and the second gear may be integrally coupled to the third gear so that a center portion thereof may be located at each of opposite end portions of the third gear.

The gear device may include a plurality of gears to generate the boosting force in a process in which power of the motors may be transmitted; the gear device may include at least one worm gear and a worm wheel gear; and the worm gear and the worm wheel gear may include final reduction gears and the rotation stopper may be coupled to a position eccentric from a rotation center portion of the worm wheel gear.

The foldable pedal apparatus may include: a moving guide including a first end portion inserted into a guide groove formed in the hysteresis lever to be movable along the guide groove and including a second end portion coupled to the gear device through a connection pin, the moving guide moving along the guide groove when the gear device rotates; and a rubber damper coupled to the moving guide, wherein when the pedal pad rotates to be inserted into the pedal housing in a response that the driver operates the pedal pad in a pop-up state, the rubber damper may generate a pedal force while being elastically deformed due to be in contact with the pedal pad.

The pedal pad may have a damper avoidance hole; and when the gear device and the rotation stopper rotate by operation of the motor, and when the pedal pad is inserted into the pedal housing and rotates to be hidden as the rotation stopper presses the pedal pad, the moving guide may move along the guide groove in a direction of protruding from a rod portion, and when the pedal pad is in a hidden state, the rubber damper may be inserted in the damper avoidance hole.

To prevent the rubber damper from being deformed by the pedal pad when the rubber damper is inserted in the damper avoidance hole, the damper avoidance hole may be formed greater than the rubber damper.

The pedal pad may have a damper avoidance hole into which the rubber damper may be inserted when the pedal pad is in a hidden state; a first guide avoidance hole may be formed at a first side portion of the damper avoidance hole, and when the pedal pad rotates to be inserted into the pedal housing in response to operation of the pop-up pedal pad by the driver, the second end portion of the moving guide may be inserted into the first guide avoidance hole to prevent interference with the pedal pad; and a second guide avoidance hole may be formed at a second side portion of the damper avoidance hole, and when the pedal pad is hidden, the second end portion of the moving guide may be inserted into the second guide avoidance hole to prevent interference with the pedal pad.

In the foldable pedal apparatus according to an exemplary embodiment of the present disclosure, in the manual driving mode in which the pedal is operated by the driver by himself or herself, the pedal pad protrudes toward the driver to be exposed (pop-up) so that the driver can operate the pedal apparatus, and in the autonomous driving state, the pedal pad is hidden and exposure toward the driver is prevented (hidden) so that the driver cannot operate the pedal apparatus. In the autonomous driving state, the comfortable rest of the driver is possible, and moreover, mis-operation of the pedal apparatus in the autonomous driving state is prevented, inducing safety improvement.

Furthermore, according to an exemplary embodiment of the present disclosure, the foldable pedal apparatus is configured to generate a boosting force by the gear device transmitting power of the motors to implement the foldable function of the pedal pad, so that cost reduction and size reduction may be induced with use of the minimum-capacity motors.

Furthermore, according to an exemplary embodiment of the present disclosure, the foldable pedal apparatus is configured to implement the foldable function of the pedal apparatus by rotations of the gear device and the rotation stopper by operation of the motors, so that the number of parts can be minimized with the mechanism of the foldable function made as simple as possible, and cost reduction, weight reduction, and layout minimization may be induced.

Furthermore, according to an exemplary embodiment of the present disclosure, the foldable pedal apparatus is the organ type electric pedal apparatus, which has the high-load spring module and the hysteresis lever, and the pedal apparatus is configured to change of parts of the hysteresis lever. Accordingly, a step force, a stroke, a hysteresis operation force required differently for each vehicle model may be tuned so that cost reduction may be induced.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
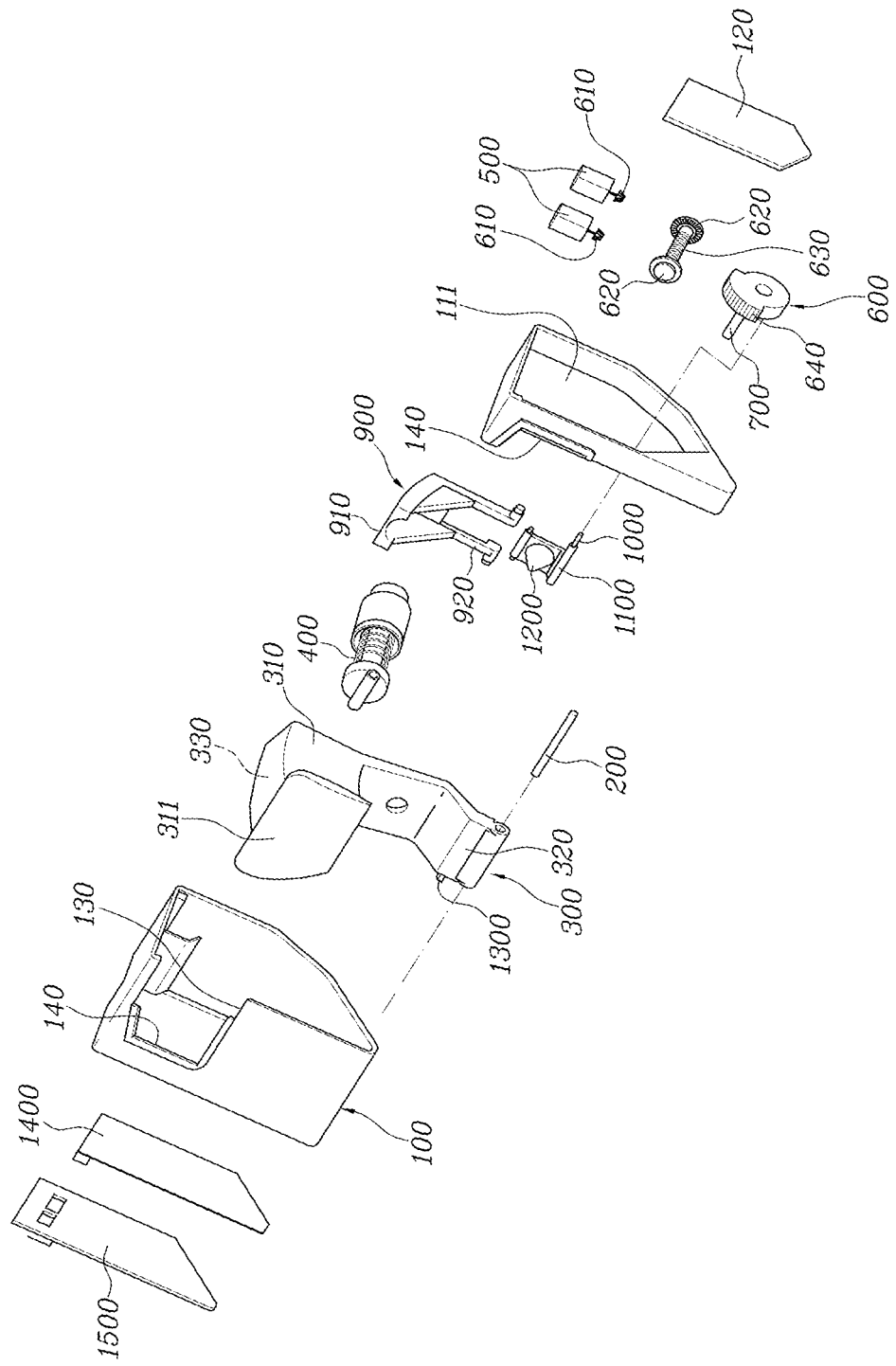
FIG. 1 is an exploded view showing a foldable pedal apparatus according to an exemplary embodiment of the present disclosure.
Figure 2:
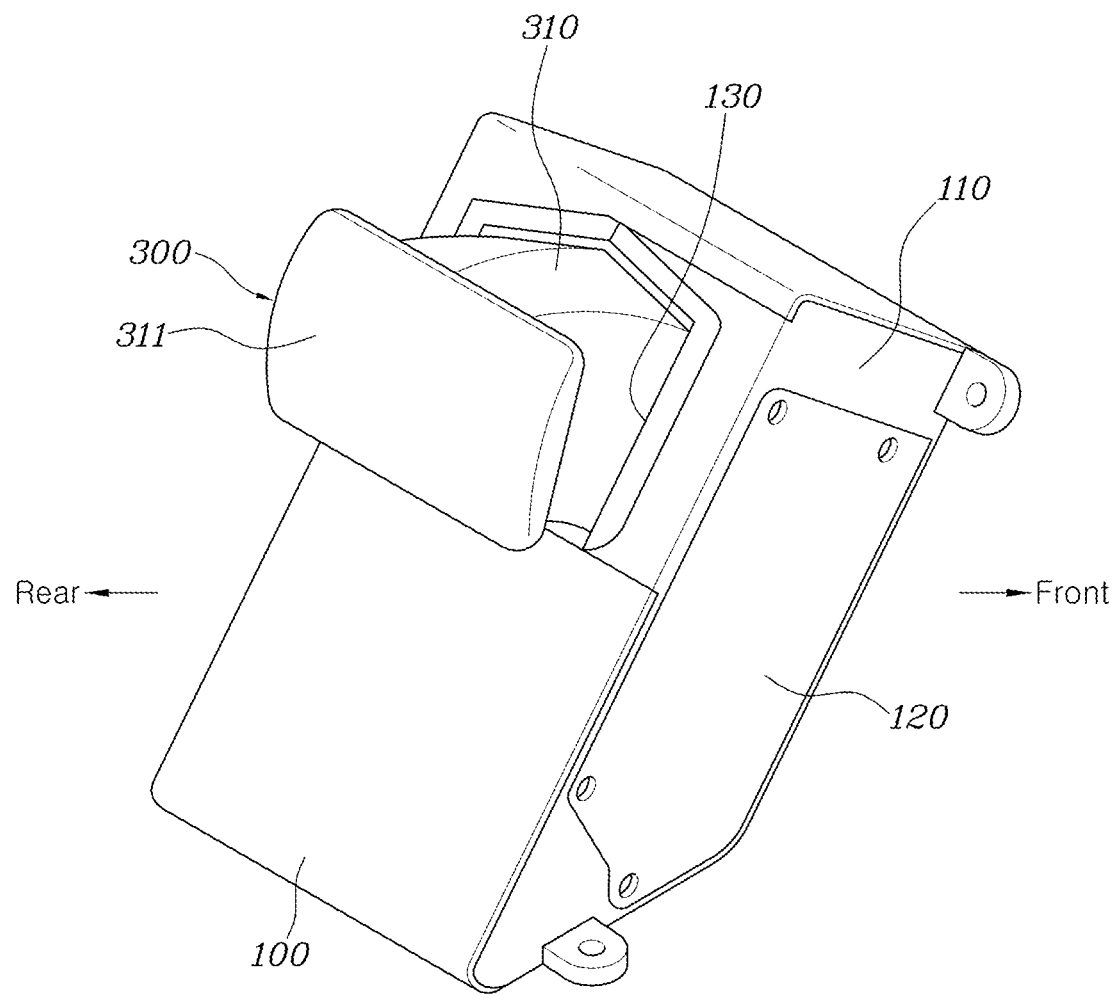
FIG. 2 is a view showing an assembled state of FIG. 1, wherein a pedal pad is in a pop-up state.
Figure 3:
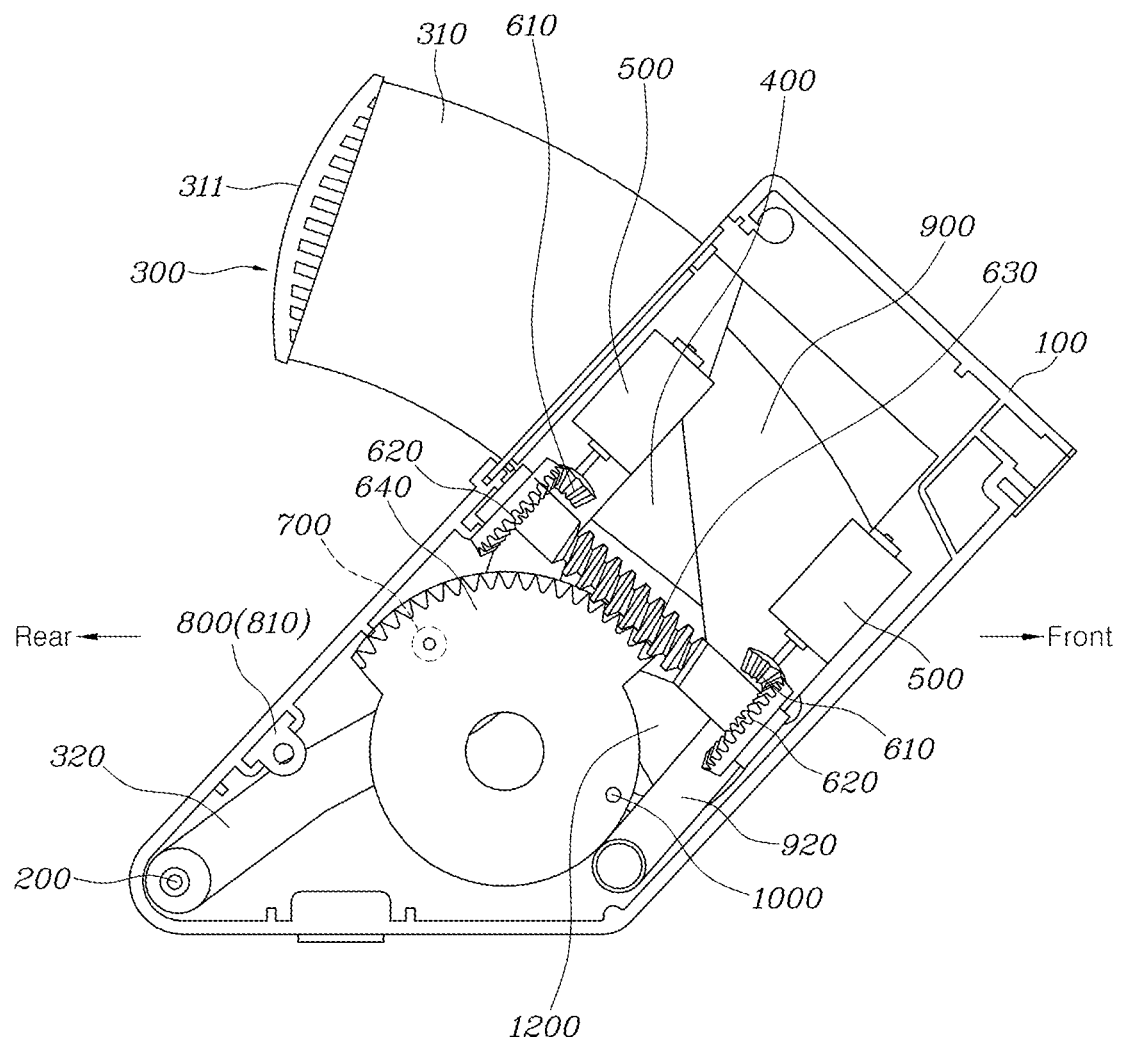
FIG. 3 is a side view showing the inside structure of FIG. 2.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, exemplary embodiments described in the specification will be described in detail with reference to accompanying drawings, and regardless of the reference numerals, the same reference numerals will refer to the same or like parts, and redundant descriptions thereof will be omitted.

The suffixes "module and "part" for the components used in the following description are provided or mixed in consideration of only the ease of writing the specification, and do not have distinct meanings or roles by themselves.

In the following description, if it is decided that the detailed description of known function or configuration related to the present disclosure makes the subject matter of the present disclosure unclear, the detailed description is omitted.

Furthermore, the accompanying drawings are only for understanding of the exemplary embodiments of the present disclosure, and the technical ideas included in the specification are not limited by the accompanying drawings, and those skilled in the art will appreciate that various modifications, additions and substitutions are possible, without departing from the scope and spirit of the present disclosure as included in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be directly connected to or directly coupled to another element or be connected to or coupled to another element, including the other element intervening therebetween.

On the other hand, it is to be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that is configured to control a specific function of a vehicle, and does not mean a generic function unit.

The controller may include a communication device communicating with other controllers or a sensor to control the function in charge, a memory storing an operation system or a logic command and input/output information, and at least one process performing determination, calculation, and decision necessary for controlling the function in charge.

Hereinbelow, a foldable pedal apparatus for a vehicle according to exemplary embodiments of the present disclosure will be described with reference to accompanying drawings.

According to an exemplary embodiment of the present disclosure, as shown in FIGS. 1 to 17, the foldable pedal apparatus for a vehicle includes: a pedal housing 100 securely provided in a lower space of a driver's seat; a pedal pad 300 rotatably coupled to the pedal housing 100 by a hinge pin 200 as a medium, and operated by a driver; a spring module 400 supplying an elastic force to the pedal pad 300 so that the pedal pad 300 protrudes from the pedal housing 100; a gear device 600 rotating by receiving power of motors 500 fixed to the pedal housing 100 and generating a boosting force; and a rotation stopper 700 coupled to the gear device 600.

Figure 15:
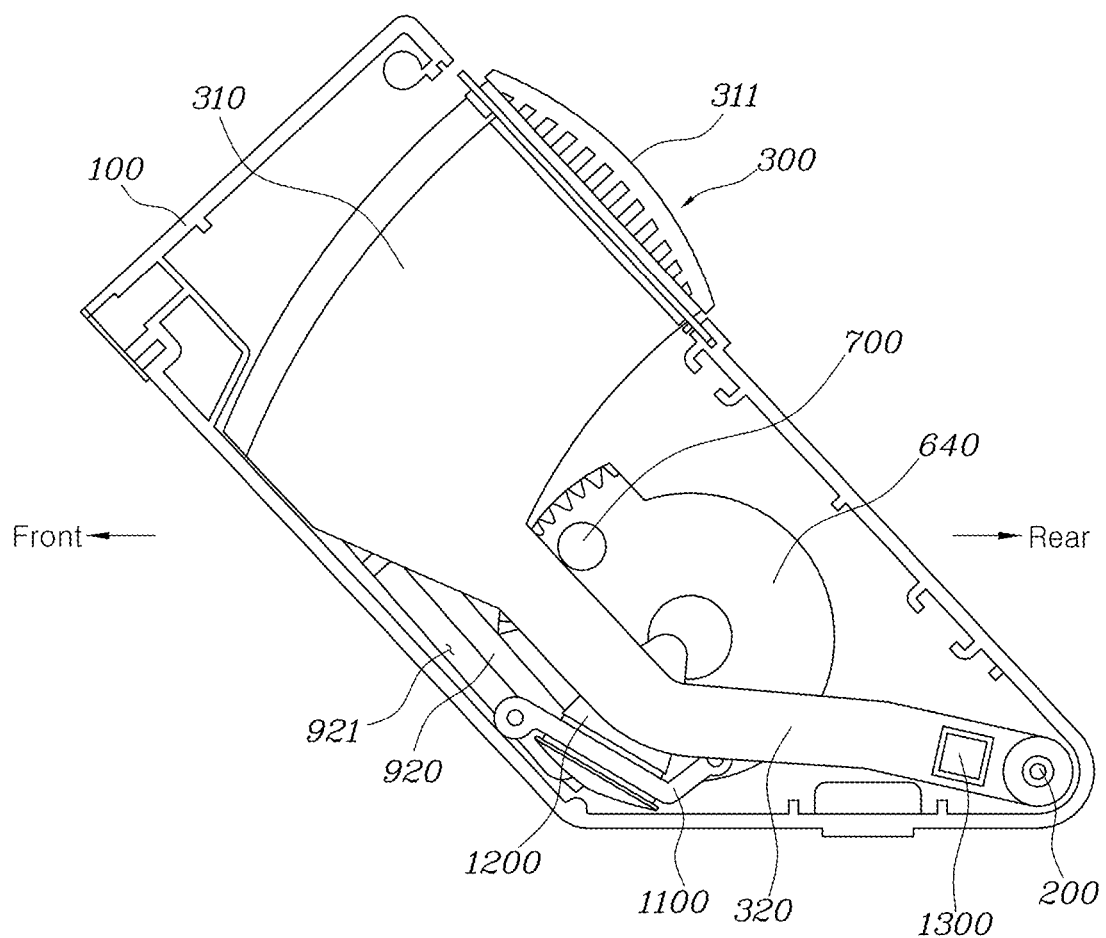
FIG. 15, FIG. 16 and FIG. 17 are views showing a hidden state of the pedal pad according to an exemplary embodiment of the present disclosure.
Figure 16:
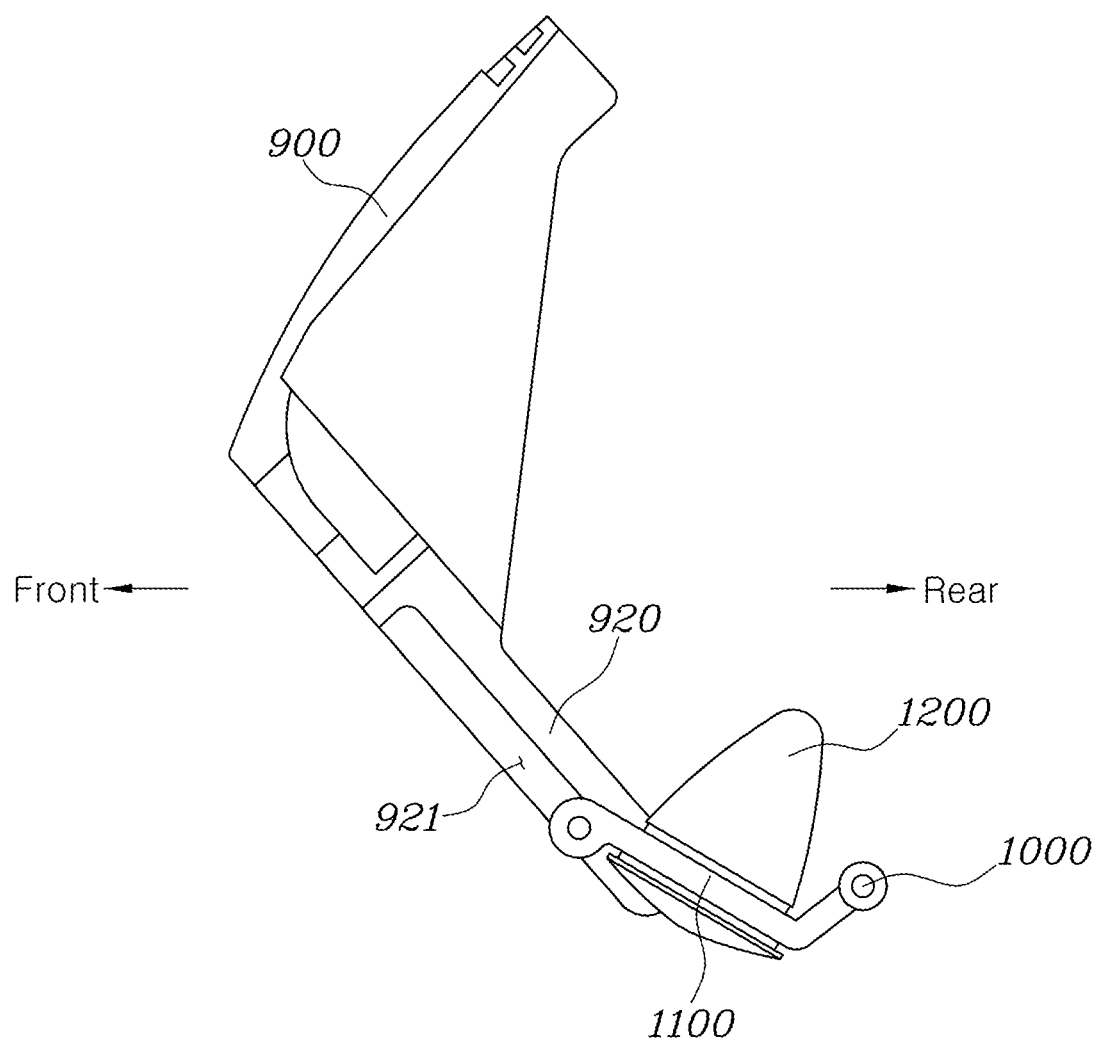
Figure 17:
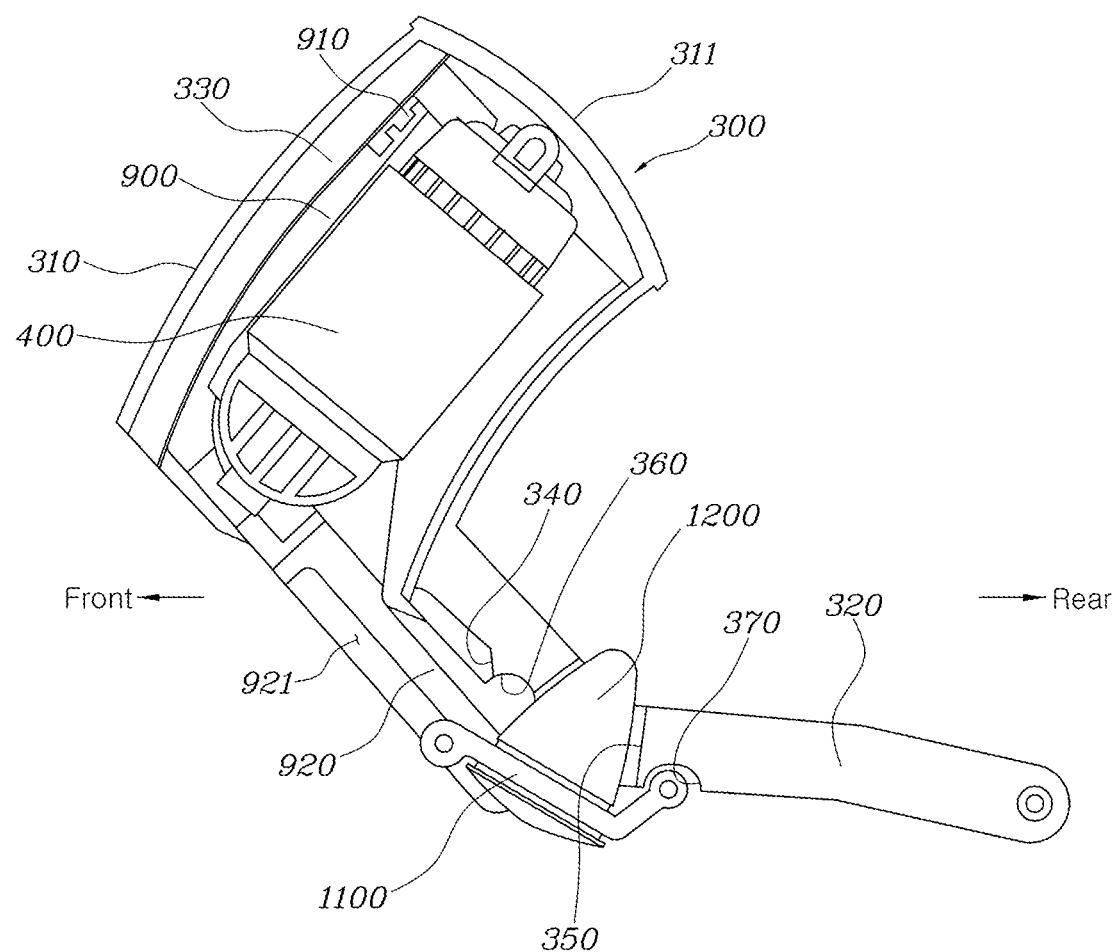
Figure 18:
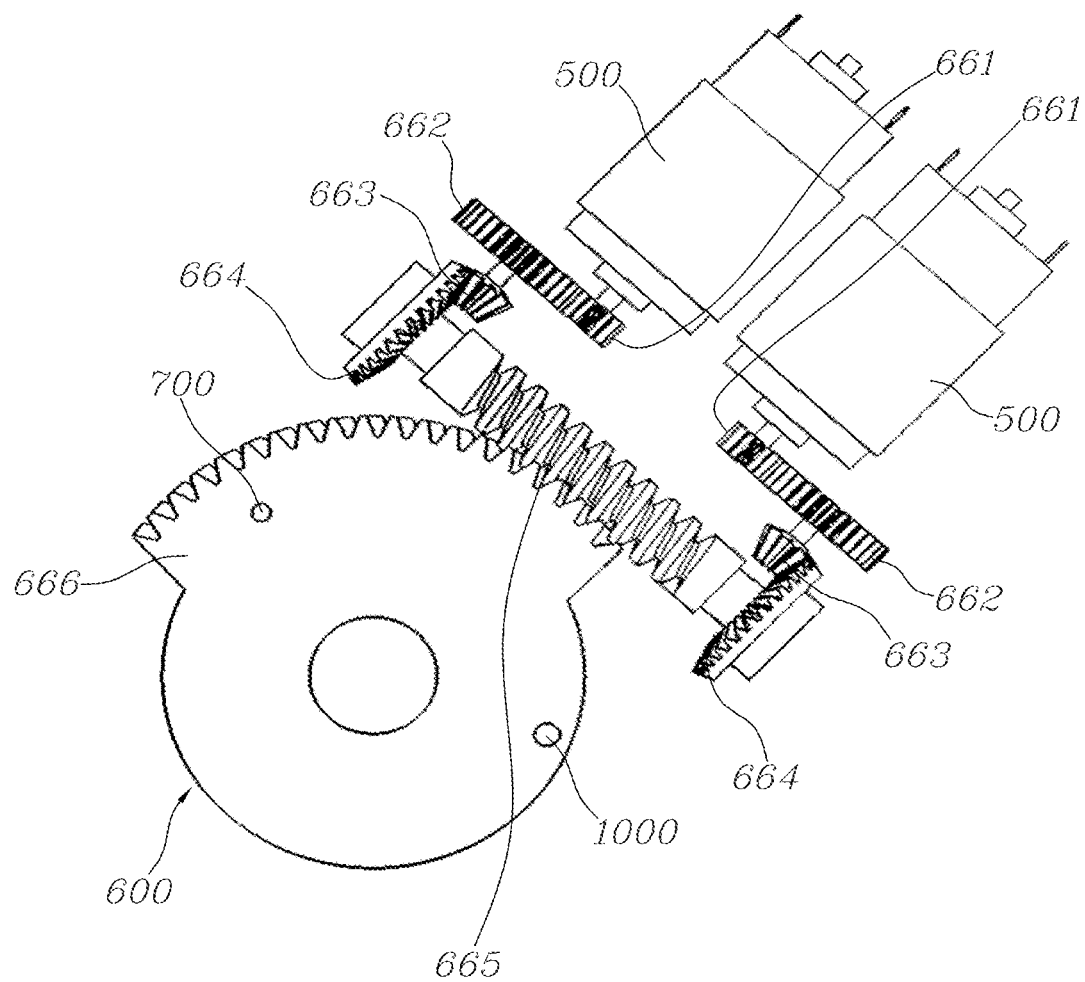
FIG. 18 is a view showing a gear device according to various exemplary embodiments of the present disclosure.

In an autonomous driving situation, as the gear device 600 rotates by operation of the motors 500 and the rotation stopper 700 presses the pedal pad 300, the pedal pad 300 rotates forward and is inserted into the pedal housing 100, and thus the pedal pad 300 is hidden so that it is impossible for the driver to operate the pedal pad 300 (referring to FIG. 15, FIG. 16 and FIG. 17).

When the pedal pad 300 is in the hidden state, the pedal pad 300 is inserted into the pedal housing 100 to be prevented from being exposed to the driver or passengers' view.

In the manual driving mode, as the gear device 600 rotates by operation of the motors 500, the pedal pad 300 is released from pressure by the rotation stopper 700, and simultaneously, the pedal pad 300 rotates rearward by the elastic force of the spring module 400 to protrude from the pedal housing 100. Accordingly, the pedal pad 300 protrudes toward the in-vehicle space, and thus the pedal pad 300 is pop-up so that the driver can operate the pedal apparatus (referring to FIG. 2, FIG. 3, FIG. 4, FIG. 5, FIG. 6, FIG. 7, and FIG. 8).

The pedal housing 100 has a box shape with an empty inside portion, and includes the pedal pad 300, the high-load spring module 400, a hysteresis lever and a moving guide to be described later, etc. Therein.

The pedal housing 100 may have a shape with an open one side portion, and the pedal housing 100 may include a side cover 110. The side cover 110 is removably coupled to the pedal housing to cover the one side portion of the pedal housing 100.

A cover groove 111 having a predetermined size is formed on an external portion of the side cover 110, and the cover groove 111 is provided to be interrupted from the inside space of the pedal housing 100 by the side cover 110. The motors 500 and the gear device 600 are provided to be located inside the cover groove 111, and the rotation stopper 700 is provided to protrude toward the inside space of the pedal housing 100 through the side cover 110.

The motors 500 generating power to perform a foldable function and the gear device 600 transmitting power of the motors 500 are located inside a safe space to be more efficiently protected and to prevent penetration of foreign materials. Therefore, the motors 500 and the gear device 600 are provided inside the cover groove 111 of the side cover 110 interrupted from the inside space of the pedal housing 100.

The cover groove 111 of the side cover 110 is sealed by a protection cover 120 and the motors 500 and the gear device 600 provided inside the cover groove 111 are disconnected from the outside space.

Figure 4:
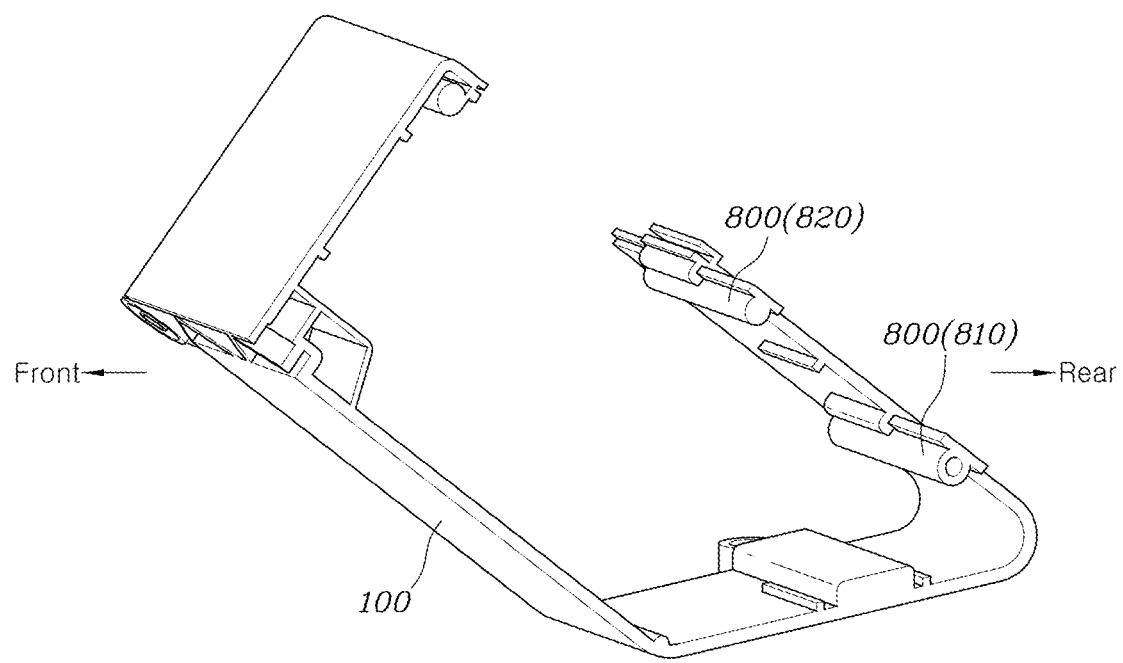
FIG. 4 and FIG. 5 are views showing a state in which a rubber stopper is coupled to a pedal housing according to an exemplary embodiment of the present disclosure.
Figure 5:
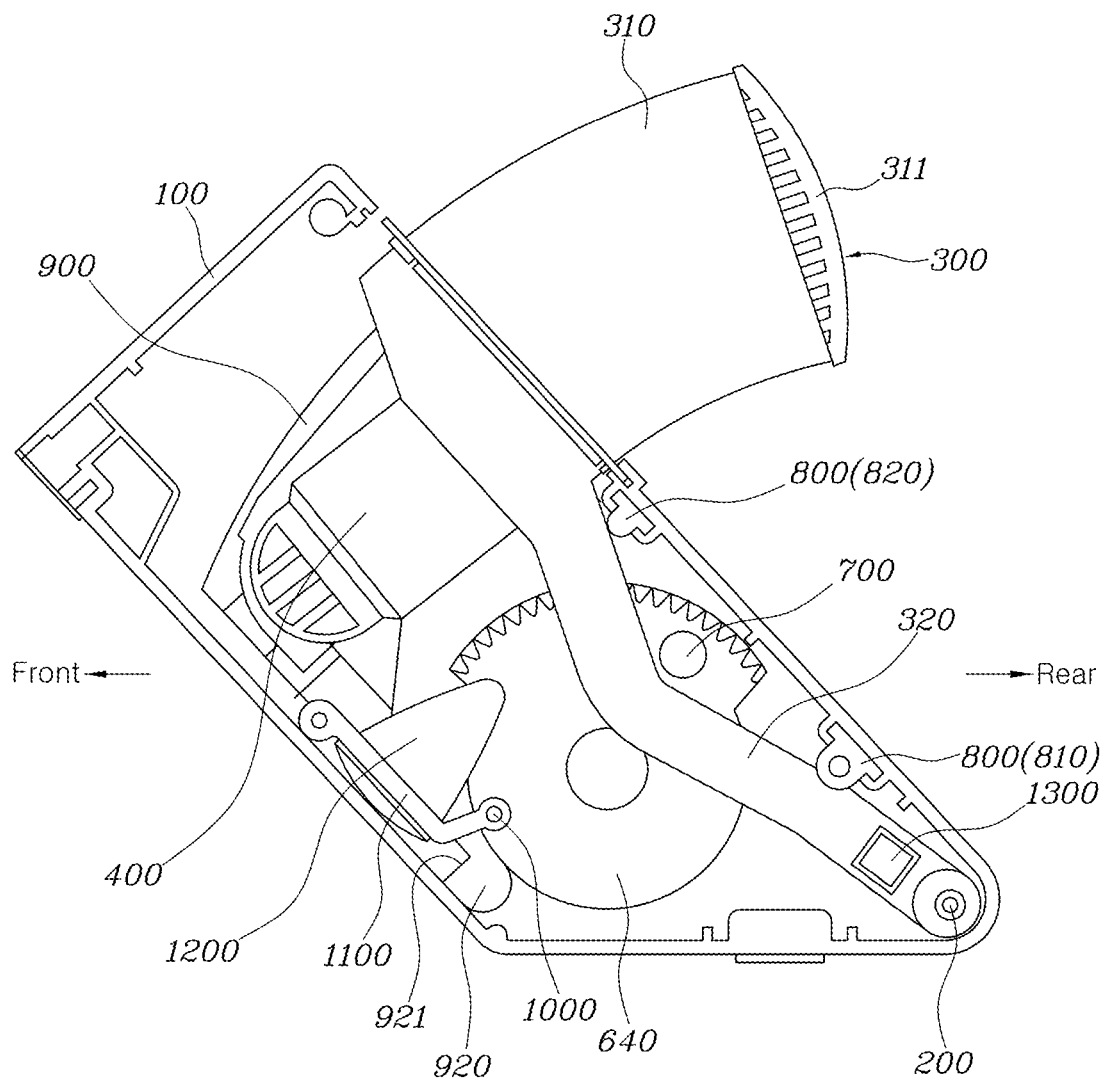
Figure 6:
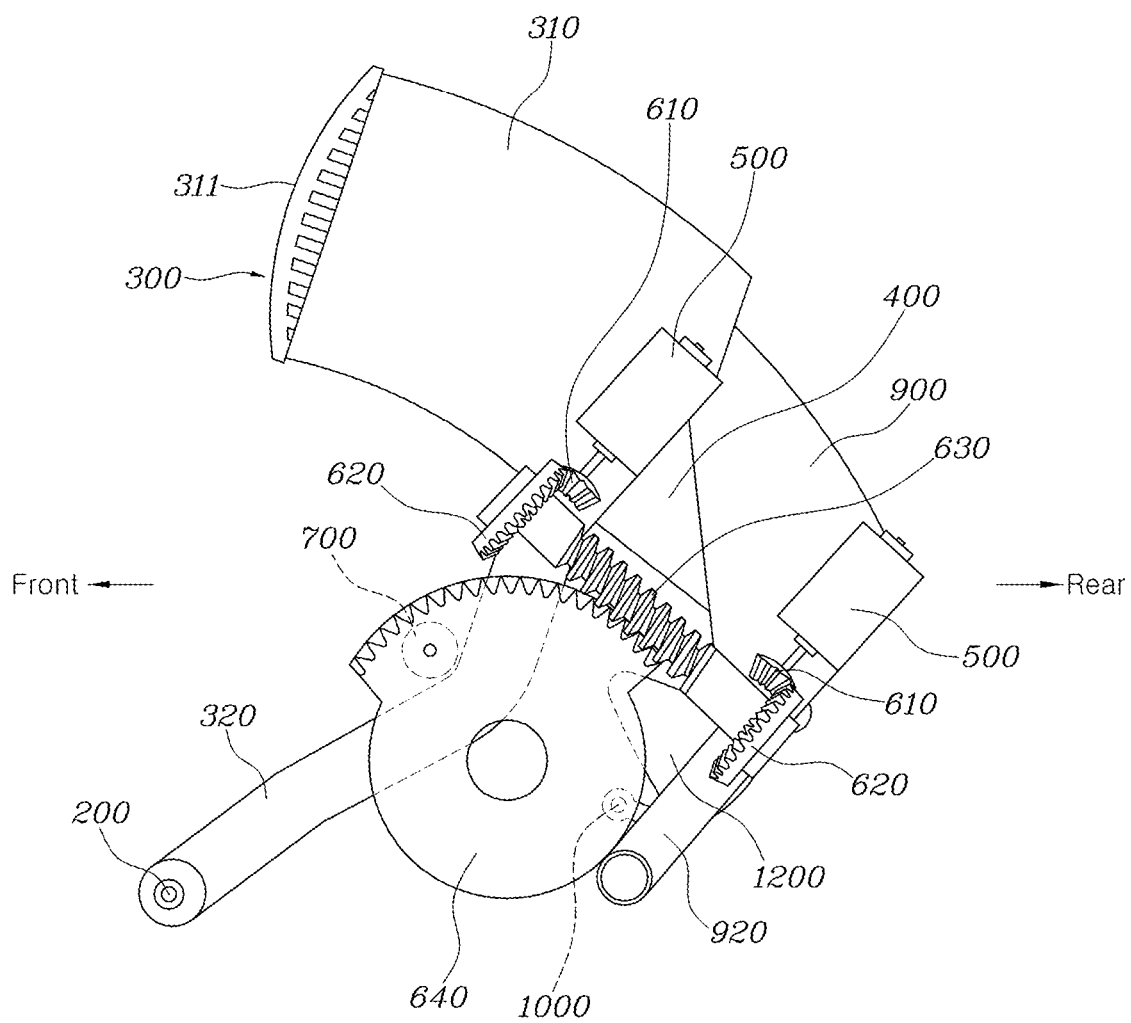
FIG. 6, FIG. 7, FIG. 8, FIG. 9, FIG. 10, FIG. 11 and FIG. 12 are views showing the pedal pad in the pop-up state and showing the inside structure of the pedal apparatus.
Figure 7:
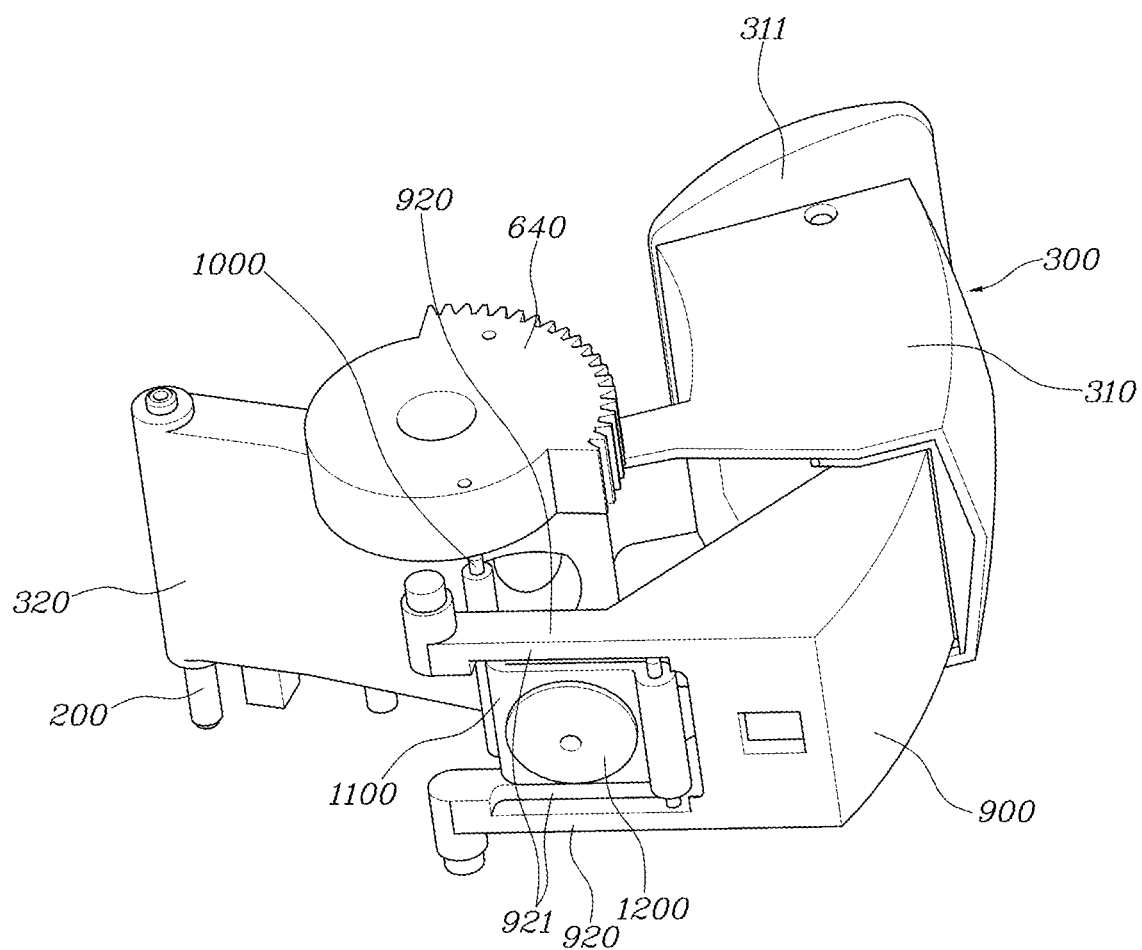
Figure 8:
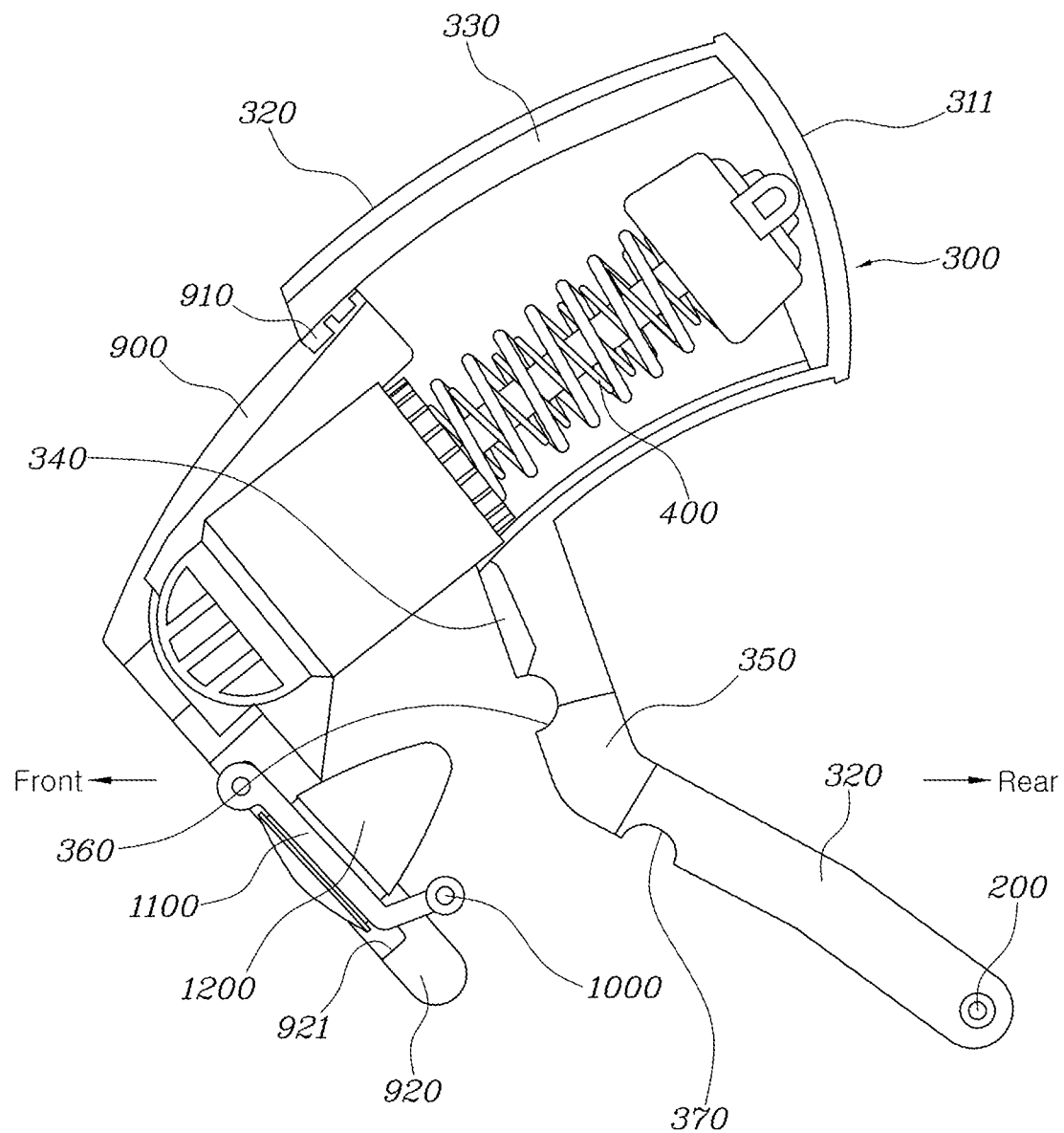

According to the exemplary embodiment of the present disclosure, the foldable pedal apparatus includes a rubber stopper 800 coupled to the pedal housing 100 and provided as a stopped by being brought into contact with the pedal pad 300 when the pedal pad 300 rotates to protrude from the pedal housing 100 (referring to FIG. 4 and FIG. 5).

When the pedal pad 300 rotates to protrude from the pedal housing 100 and is restored to an initial position thereof, the rubber stopper 800 coupled to the pedal housing 100 is brought into contact with a pedal arm portion of the pedal pad 300 to stop the pedal pad 300, and a restored position of the pedal pad 300 is regulated.

Furthermore, when the pedal pad 300 is brought into contact with the rubber stopper 800 in restoration of the pedal pad 300, the rubber stopper 800 reduces shock and noise.

Figure 13:
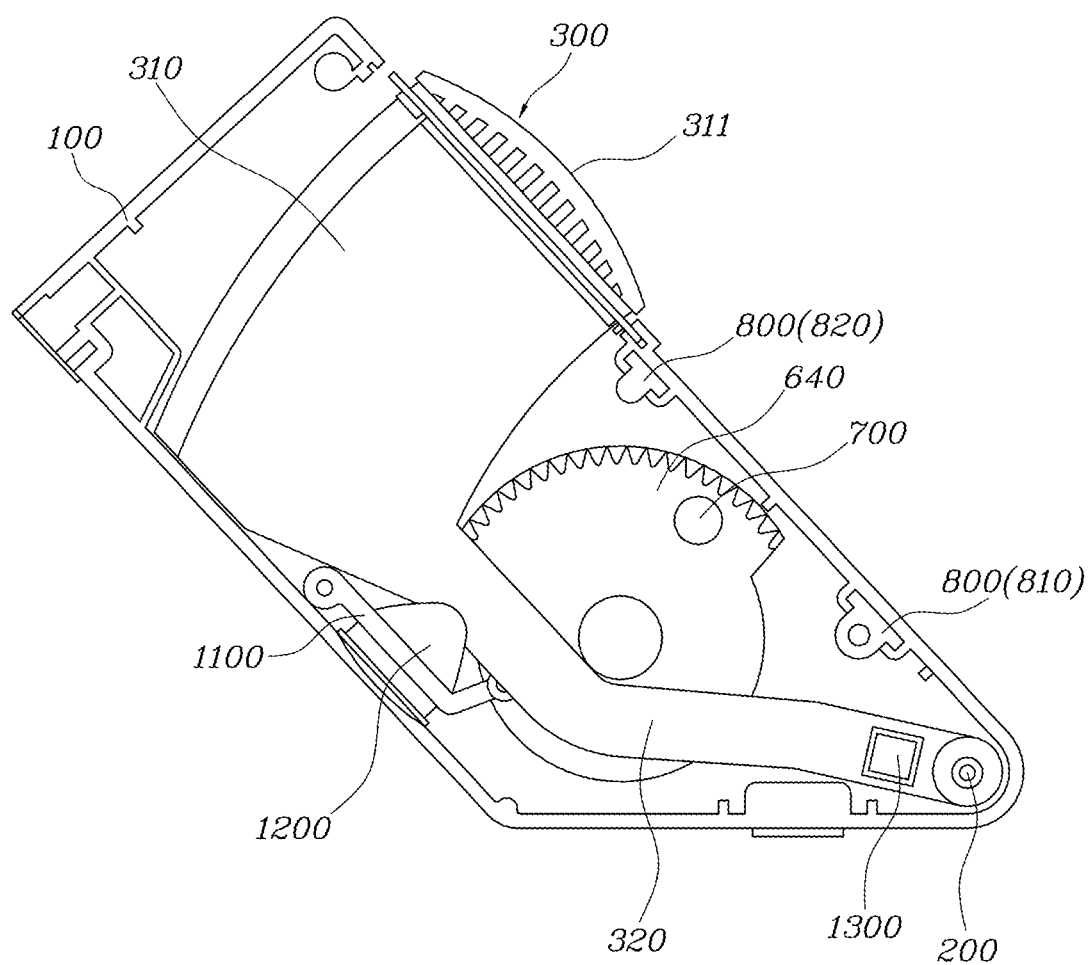
FIG. 13 and FIG. 14 are views showing a normal operation state in which a driver operates the pedal pad in the pop-up state with the driver's foot and the pedal pad rotates.

Meanwhile, the driver steps on the pop-up pedal pad 300 and the pedal pad 300 rotates to be inserted into the pedal housing 100, and at the present point, in a full stroke of the pedal pad 300, a full stroke position of the pedal pad 300 is regulated as a lower end portion of a pad portion touches the bottom portion of the pedal housing 100 (referring to FIG. 13).

Furthermore, as the gear device 600 rotates by operation of the motors 500 and the rotation stopper 700 presses the pedal pad 300, the pedal pad 300 is rotated forward and is inserted into the pedal housing 100, and when the pedal pad 300 is in the hidden state, the pedal pad 300 in the hidden state is restrained by a force of the rotation stopper 700 pressing the pedal pad 300 (referring to FIG. 15).

The rubber stopper 800 includes a first rubber stopper 810 and a second rubber stopper 820 securely coupled to an internal upper surface of the pedal housing 100.

The first rubber stopper 810 and the second rubber stopper 820 have the shape of straight rods and are fixed to positions spaced from each other on the internal upper surface of the pedal housing 100.

The first rubber stopper 810 is coupled to a position closer to a rotation center portion (the hinge pin) of the pedal pad 300 than the second rubber stopper 820, so that when the pedal pad 300 rotates to protrude from the pedal housing 100, the first rubber stopper 810 is brought into contact with the pedal pad 300 first and the second rubber stopper 820 is brought into contact with the pedal pad 300 later.

The first rubber stopper 810 and the second rubber stopper 820 are brought into contact with the pedal arm portion of the pedal pad 300. The first rubber stopper 810 is brought into contact with the pedal arm portion first and with a time gap in therebetween, the second rubber stopper 820 is brought into contact with the pedal arm portion later.

The first rubber stopper 810 that comes into contact with the pedal pad 300 first has a hollow shape with an empty inside portion to absorb restoration energy by changing the shape in contact with the pedal pad 300 to absorb as much shock and noise as possible.

The second rubber stopper 820 that comes into contact with the pedal pad 300 later has a solid shape with filled inside portion to absorb shock secondarily. The second rubber stopper 820 severs to bring the pedal pad 300 to a complete stop by use of an improved supporting force compared to the first rubber stopper 810.

According to an exemplary embodiment of the present disclosure, the foldable pedal apparatus for a vehicle includes a hysteresis lever 900, the hysteresis lever 900 is located inside the pedal housing 100 and provided to be rotatably with respect to the pedal housing 100, an upper portion of the hysteresis lever 900 is inserted into the pedal pad 300 to come into contact with an internal surface of the pedal pad 300, and when the driver operates the pedal pad 300 so that the pedal pad 300 rotates and is inserted into the pedal housing 100, the hysteresis lever 900 generates hysteresis by a friction force between the hysteresis lever 900 and the pedal pad 300.

The hysteresis lever 900 is an L-shaped type lever, a lower end portion of the spring module 400 is rotatably supported by the hysteresis lever 900, and a lever friction portion 910 is provided outside the hysteresis lever 900 to generate a friction force by contact with the pedal pad 300.

The hysteresis lever 900 includes a pair of rod portions 920 rotatably coupled to the pedal housing 100, and the rod portions 920 are disposed in parallel to each other while being spaced from each other. The rod portions 920 have respective guide grooves 921 extending in longitudinal directions of the rod portions 920.

The hysteresis lever 900 has protrusions formed on end portions of the rod portions 920 rotatably coupled to the pedal housing 100.

When the spring module 400 is provided so that opposite end portions (upper and lower end portions) thereof are respectively supported by the pad portion 310 of the pedal pad 30 and the hysteresis lever 900, and an upper end portion of the hysteresis lever 900 remains a contact state with the pad portion 310 by a spring force of the spring module 400. Accordingly, when the pedal pad 300 rotates, implementation of hysteresis is possible, and the spring force of the spring module 400 allows initial operating force of the pedal pad 300 to be generated.

The pedal apparatus according to an exemplary embodiment of the present disclosure has a following structure. When the driver operates the pedal pad 300 so that the pad portion 310 rotates to be inserted into the pedal housing 100, the spring force of the spring module 400 increases, and a force of the hysteresis lever 900 pressing the pad portion 310 by the spring force increases and a friction force increases, and hysteresis is implemented in operating the pedal pad 300 by increasing friction force.

The pedal pad 300 includes the box-shaped pad portion 310 including a pad surface 311 which is operated by the driver's foot, and into which an upper end portion of the spring module 400 is inserted and rotatably provided, and into which the upper portion of the hysteresis lever 900 is inserted and is in contact with therewith; and a pedal arm portion 320 of which a first end portion is connected to the pad portion 310 and a second end portion is coupled to the hinge pin 200.

The pad portion 310 and the pedal arm portion 320 are formed to be connected to each other in the "L" shape in a side view thereof, implementing an organ-type pedal apparatus.

A pad friction portion 330 is provided in the pad portion 310 to be in contact with the lever friction portion 910 of the hysteresis lever 900. When the pedal pad 300 rotates, the pad friction portion 330 may generate a friction force due to friction between the pad friction portion 330 and the lever friction portion 910.

The pad portion 310 is inserted into the pedal housing 100 or protrudes from the pedal housing 100 through a housing hole 130 formed in the pedal housing 100 in response to rotation of the pedal pad 300, and the pedal arm portion 320 is provided to be located in the pedal housing 100 instead of rotation of the pedal pad 300.

The pad portion 310 has a structure of which a lower portion into which the spring module 400 and the hysteresis lever 900 are inserted is open and remaining all portion is sealed for prevention of inflow of foreign materials.

The pedal pad 300 is provided to the pedal housing 100 so that a rear end portion of the pedal arm portion 320 is rotatable forward and rearward on the hinge pin 200, and in forward rotation of the pedal arm portion 320, the pad portion 310 spaced apart forward from the hinge pin 200 is inserted into the pedal housing 100 through the housing hole 130 formed in the pedal housing 100, and in rearward rotation of the pedal arm portion 320, the pad portion 310 is exposed by protruding from the pedal housing 100 toward the rear side where the driver is located.

An upper surface and a lower surface of the pad portion 310 have arc shapes with the same trajectory as a radius of rotation of the pedal pad 300 on the hinge pin 200, and the structure maintains a gap between the pad portion 310 and the housing hole 130 formed in the pedal housing 100 constant so that it is possible to prevent the entry of foreign materials as much as possible.

The pad portion 310 is inserted into the pedal housing 100 or protrudes from the pedal housing 100 through the housing hole 130 formed in the pedal housing 100 in response to rotation of the pedal pad 300, and the pedal arm portion 320 is provided to be located in the pedal housing 100 instead of rotation of the pedal pad 300, so that contact with the driver is prevented.

Therefore, when the driver operates the pedal pad 300 with the driver's foot, the driver can operate only the pad surface 311 of the pad portion 310, the pad surface being exposed from the pedal housing 100, and the pedal arm portion 320 located inside the pedal housing 100 is prevented from being in contact with the driver's foot and operation thereof is impossible, and thus mis-operation of the driver may be prevented.

According to an exemplary embodiment of the present disclosure, a foreign material inflow preventing guide 140 is coupled to the housing hole 130 formed in the pedal housing 100 along an edge portion of the housing hole 130.

The foreign material inflow preventing guide 140 is configured to eliminate a gap between the housing hole 130 of the pedal housing 100 and the pad portion 310 of the pedal pad 300 to prevent inflow of foreign materials into the pedal housing 100 through the housing hole 130.

The foreign material inflow preventing guide 140 is formed of a rubber material having elasticity to prevent wear and noise caused by contact with the pad portion 310, but is not limited thereto.

A foreign material discharge hole may be formed on the bottom surface inside the pedal housing 100 to discharge foreign materials flowing into the pedal housing 100 outward.

The spring module 400 is a high-load spring module, and provided to be located in an oblique direction along a moving direction of the pad portion 310. The upper end portion of the spring module 400 is inserted into the pad portion 310 of the pedal pad 300 and is rotatably coupled to the pad portion 310, and the lower end portion thereof is provided to be rotatable and in contact with the hysteresis lever 900.

The pedal apparatus for a vehicle requires high load for safety during operation. Therefore, the pedal apparatus according to the exemplary embodiment of the present disclosure has the structure using the high-load spring module 400, and may implement required pedal force by use of the high-load spring module 400.

Generally, the high-load spring module 400 includes at least two springs disposed in series and at least two dampers to implement the pedal force.

As the high-load spring module 400 includes at least two springs disposed in series, even when any one of the two springs is broken during use, the pedal pad 300 may be efficiently restored by a spring force of a remaining spring which is not broken.

According to the exemplary embodiment of the present disclosure, when the pedal pad 300 is hidden, a pop-up state is switched to the hidden state, and the hidden state is switched to the pop-up state, the pedal arm portion 320 and the rotation stopper 700 are brought into contact with each other.

Furthermore, when the pedal pad 300 is in the pop-up state and the pedal pad 300 rotates forward as the pop-up pedal pad 300 is operated by the driver, the pedal arm portion 320 and the rotation stopper 700 are not in contact with each other.

The state in which the pedal arm portion 320 and the rotation stopper 700 are not in contact with each other in the pop-up state of the pedal pad 300 is the same as the state in which the pedal arm portion 320 of the pedal pad 300 are not in contact with the rotation stopper 700 when the pedal pad 300 rotates to be protrude from the pedal housing 100 and is restored to the initial position by a spring force of the spring module 400. Accordingly, a return noise generated when the pedal pad 300 is restored to the initial position may be reduced.

According to an exemplary embodiment of the present disclosure, the motors 500 are securely provided to the pedal housing 100 and are a two-way rotational motors configured for rotating clockwise and counterclockwise, and at least two motors may be provided to implement fail safe, and when any one of the two motors is broken, the other motor which is not broken allows the gear device 600 to rotate.

Operation of the motors 500 may be configured to be controlled by a PCB, which will be described later.

According to various exemplary embodiments as shown in FIGS. 1 to 15, the gear device 600 includes a first gear 610 coupled to the motors 500, a second gear 620 gear-engaged to the first gear 610, a third gear 630 rotating while being integrated with the second gear 620, and a fourth gear 640 gear-engaged with the third gear 630 and in which the rotation stopper 700 is coupled to a position eccentric from a rotation center portion of the fourth gear 640.

As the two motors 500 are provided, the first gear 610 includes two first gears 610 to be respectively coupled to the two motors 500, and the second gear 620 includes two second gears 620 to be respectively gear-engaged with the two first gears 610 one by one.

Because the third gear 630 is integrated with the two second gears 620 while being located between the two second gears 620, the third gear 630 includes one third gear 630, and the fourth gear 640, which is gear-engaged with the one third gear 630, includes one fourth gear 640.

In the gear device 600 according to an exemplary embodiment of the present disclosure, to generate a boosting force in a process in which power of the motors 500 is sequentially transmitted from the first gears 610 to the fourth gear 640, each of the second gears 620 has a larger number of gear teeth than the number of gear teeth of each of the first gears 610 and has a pitch circle diameter (PCD) formed greater than the first gear, and the fourth gear 640 has a larger number of gear teeth than the number of gear teeth of the third gear 630 and has a PCD formed greater than the third gear 630.

According to the exemplary embodiment of the present disclosure, foldable operation of the pedal apparatus is configured so that power of the motors 500 is boosted through the gear device 600 and transmitted to the rotation stopper 700, and the rotation stopper 700 presses the pedal pad 300 with a large force to rotate the pedal pad 300. Accordingly, as the minimum capacity motors may be used, cost reduction and size reduction may be achieved.

To generate a boosting force through the gear device 600, the first gears 610 and the second gears 620 include bevel gears, and the third gear 630 and the fourth gear 640 include a worm gear and a worm wheel gear, and the second gears 620 are integrally coupled to the third gear 630 so that center portions of the second gears 620 are respectively located on opposite end portions of the third gear 630.

According to the exemplary embodiment of the present disclosure, the pedal apparatus includes a moving guide 1100 of which a first end portion is inserted into in the guide grooves 921 formed in the rod portions 920 of the hysteresis lever 900 to be movable along the guide grooves 921 and a second end portion is coupled to the gear device 600 through a connection pin 1000 and moves along the guide grooves 921 when the gear device rotates.

The connection pin 1000 is coupled to the second end portion of the moving guide 1100, and the connection pin 1000 is coupled to one surface of the fourth gear 640 forming the gear device 600.

The connection pin 1000 is coupled to a position which is eccentric from the center portion of the fourth gear 640, and protrudes in parallel with the rotation stopper 700.

When the fourth gear 640 receives power of the motors 500 and rotates clockwise and counterclockwise, a rotation force of the fourth gear 640 is transmitted to the moving guide 1100 through the connection pin 1000, and the moving guide 1100 is in a state in which the first end portion thereof is inserted into the guide grooves 921 formed in the rod portions 920 of the hysteresis lever 900, so that the moving guide 1100 receives the rotating force of the fourth gear 640 through the connection pin 1000 and linearly moves along the guide grooves 921.

Figure 9:
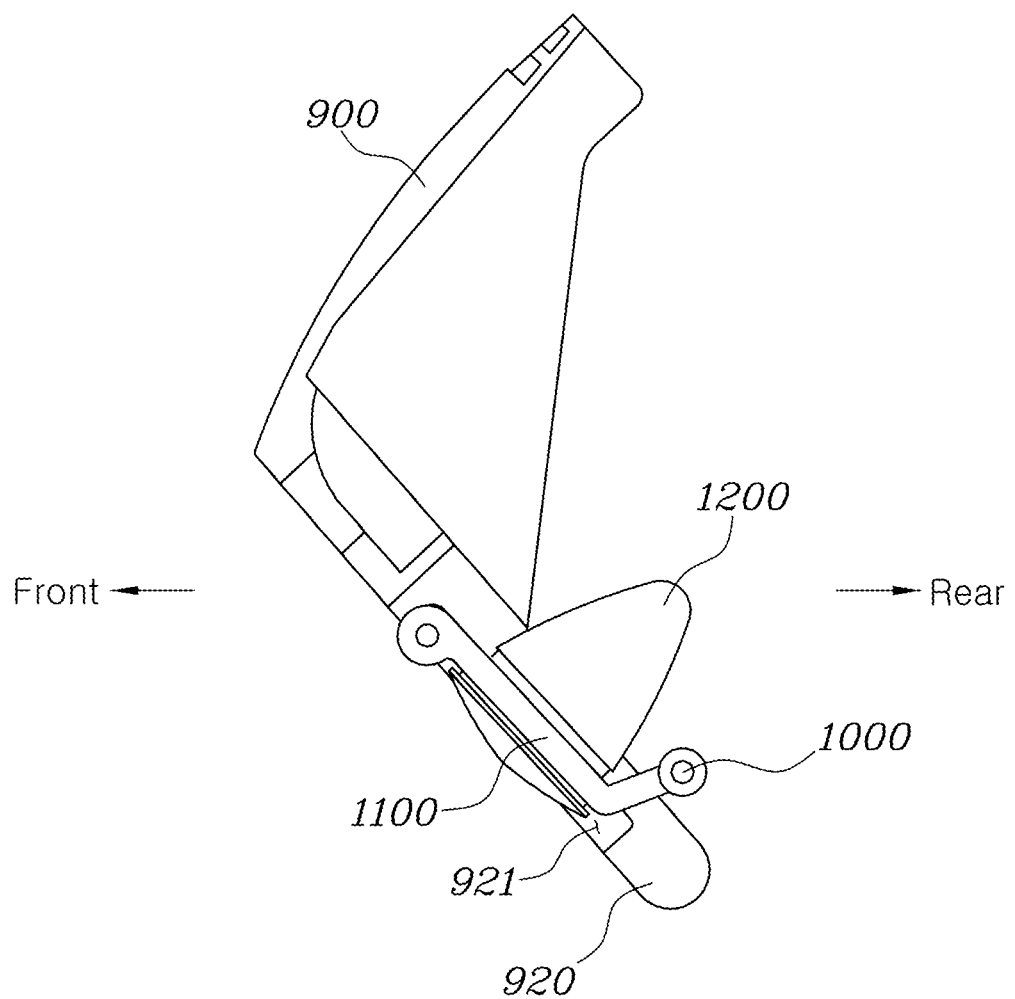
Figure 10:
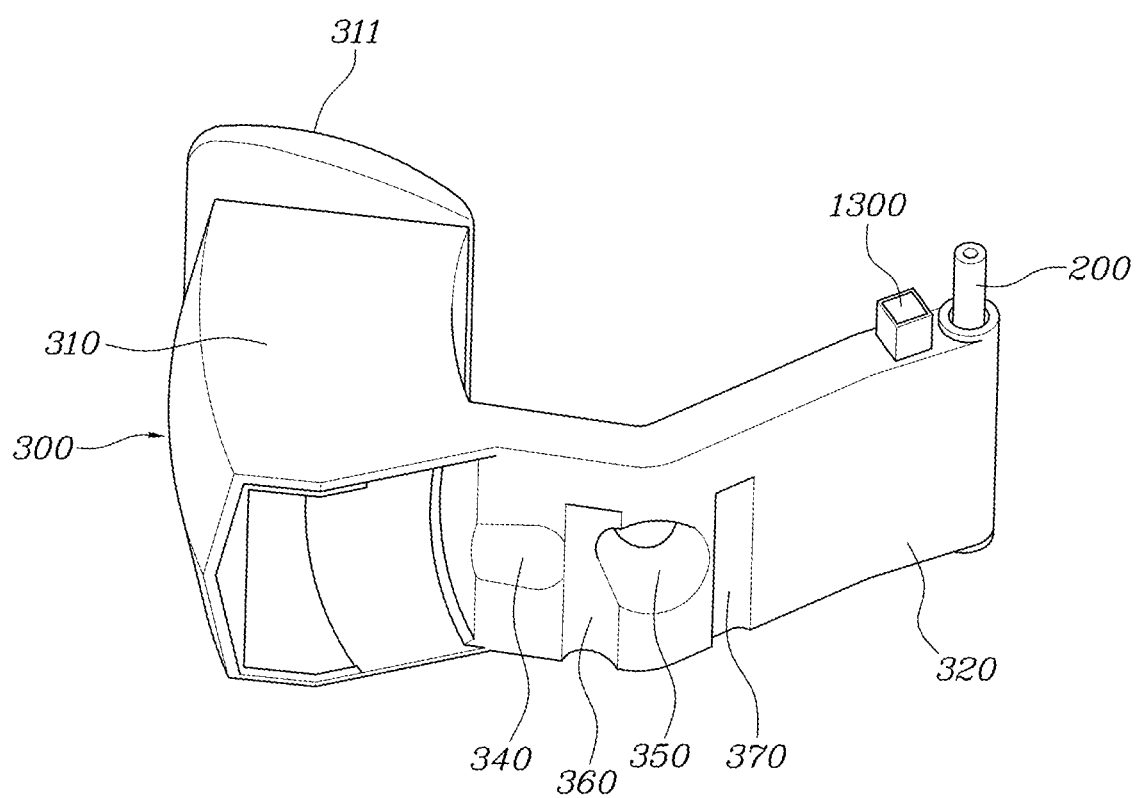
Figure 11:
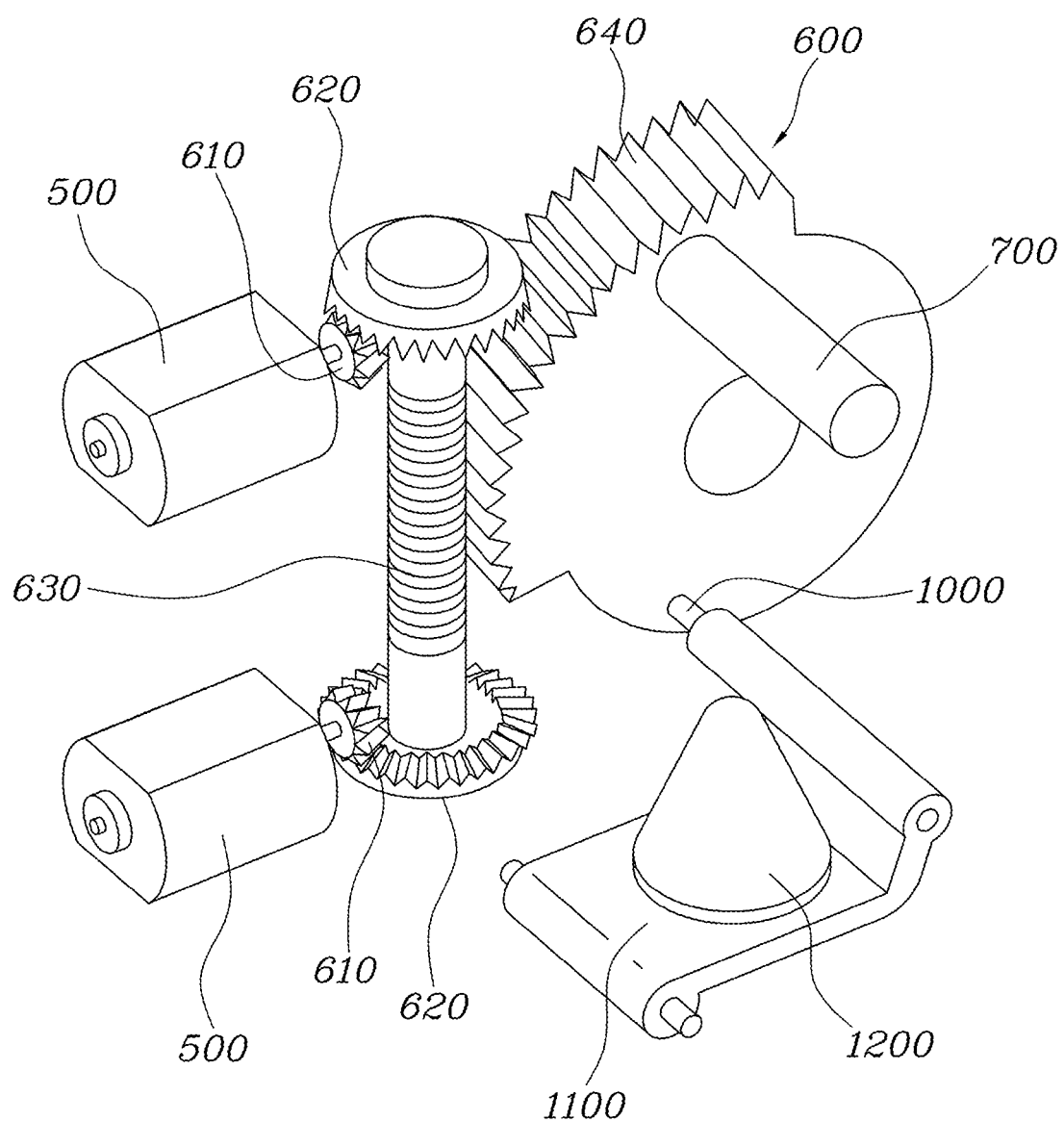
Figure 12:
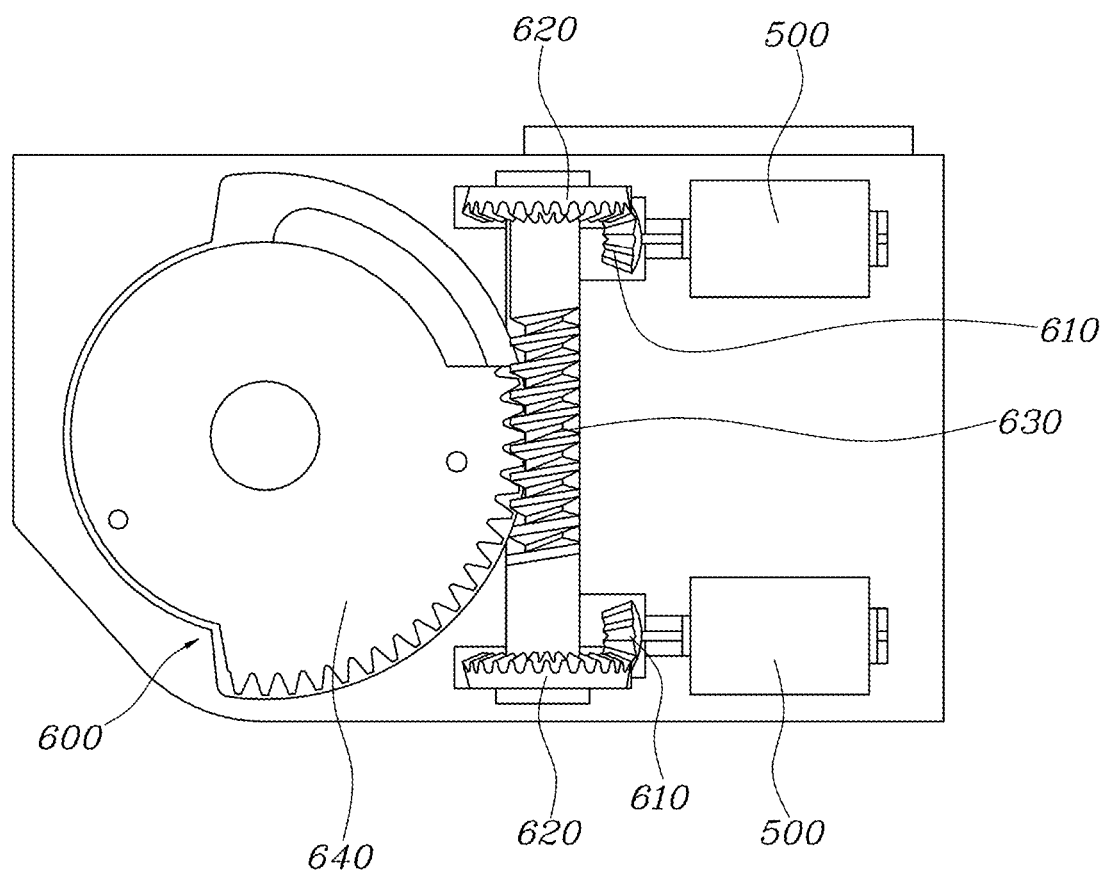

When the moving guide 1100 moves along the guide grooves 921, the moving guide 1100 moves forward as shown in FIG. 9 to be located inside of the rod portions 920 of the hysteresis lever 900 or moves rearward as shown in FIG. 16 to protrude outwardly from the rod portions 920 of the hysteresis lever 900.

As shown in FIG. 9, when the moving guide 1100 moves forward and is inserted into the rod portions 920 of the hysteresis lever 900, the pedal pad 300 is in the pop-up state of protruding from the pedal housing 100. As shown in FIG. 16, when the moving guide 1100 moves rearward and protrudes out of the rod portions 920 of the hysteresis lever 900, the pedal pad 300 is in the hidden state of being inserted into the pedal housing 100.

According to an exemplary embodiment of the present disclosure, a rubber damper 1200 is coupled to the moving guide 1100, and the driver operates the pop-up pedal pad 300. Therefore, when the pedal pad 300 rotates to be inserted into the pedal housing 100, the rubber damper 1200 is elastically deformed by being in constant with the pedal arm portion 320 of the pedal pad 300 and is configured to generate a pedal force (referring to FIG. 14).

A damper contact portion 340 including a concave groove is formed on a lower surface of the pedal arm portion 320 to be in contact with the rubber damper 1200.

The rubber damper 1200 has a cone shape of which an end portion in contact with the pedal arm portion 320 is sharp. Accordingly, in an initial contact stage of the pedal arm portion 320, while a pedal force increases weakly with a small deformed area, and when the pedal pad 300 is operated, a final pedal force of a large force may be generated as the deformed area increases.

According to an exemplary embodiment of the present disclosure, a damper avoidance hole 350 is formed on the pedal arm portion 320 of the pedal pad 300.

The damper avoidance hole 350 has a structure formed through upper and lower surfaces of the pedal arm portion 320, and a form thereof is the same as a form of the rubber damper 1200 and a size thereof is greater than a size of the rubber damper 1200.

The gear device 600 and the rotation stopper 700 rotate by operation of the motors 500, and the rotation stopper 700 presses the pedal arm portion 320 of the pedal pad 300 so that the pedal pad 300 is inserted into the pedal housing 100 and rotates to be in the hidden state. Therefore, the moving guide 1100 moves in a direction of protruding from the rod portions 920 along the guide grooves 921 formed in the rod portions 920 of the hysteresis lever 900. When the pedal pad 300 is in the hidden state, the rubber damper 1200 is inserted into the damper avoidance hole 350 (referring to FIG. 15, FIG. 16 and FIG. 17).

The damper avoidance hole 350 is formed greater than the rubber damper 1200, so that when the rubber damper 1200 is inserted into the damper avoidance hole 350, deformation of the rubber damper 1200 by the pedal arm portion 320 may be prevented.

In other words, when the pedal pad 300 is in the hidden state, the rubber damper 1200 is inserted into the damper avoidance hole 350 and is prevented from being pressed by the pedal arm portion 320. Accordingly, deformation of the rubber damper 1200 may be prevented and the durability may be improved and permanent deformation may be prevented. In the hidden state of the pedal pad 300, as the pedal pad 300 is rotatable in consideration only of the spring force of the spring module 400, the capacity of the motors 500 may be minimized.

On a lower surface of the pedal pad 300, a first guide avoidance hole 360 is formed at a first side position based on the damper avoidance hole 350 and a second guide avoidance hole 370 is formed at a second side position.

When the first end portion of the moving guide 1100 is inserted into the guide grooves 921 formed in the rod portions 920 of the hysteresis lever 900, the second end portion of the moving guide 1100 to which the connection pin 1000 is coupled protrudes upwards from the rod portions 920 of the hysteresis lever 900.

Therefore, when the pedal pad 300 rotates to be inserted into the pedal housing 100, the second end portion of the moving guide 1100 to which the connection pin 1000 is coupled may be brought into contact with the pedal arm portion 320 of the pedal pad 300 to interfere with the pedal arm portion 320, and in a case in which the pedal arm portion 320 and the second end portion of the moving guide 1100 interfere with each other, when the pedal pad 300 rotates to be inserted into the pedal housing 100, there may be a problem in that the pedal apparatus is not efficiently operated.

Therefore, according to the exemplary embodiment of the present disclosure, the first guide avoidance hole 360 and the second guide avoidance hole 370 are formed on the lower surface of the pedal pad 300 so that interference between the pedal arm portion 320 and the second end portion the moving guide 1100 may be prevented.

Figure 14:
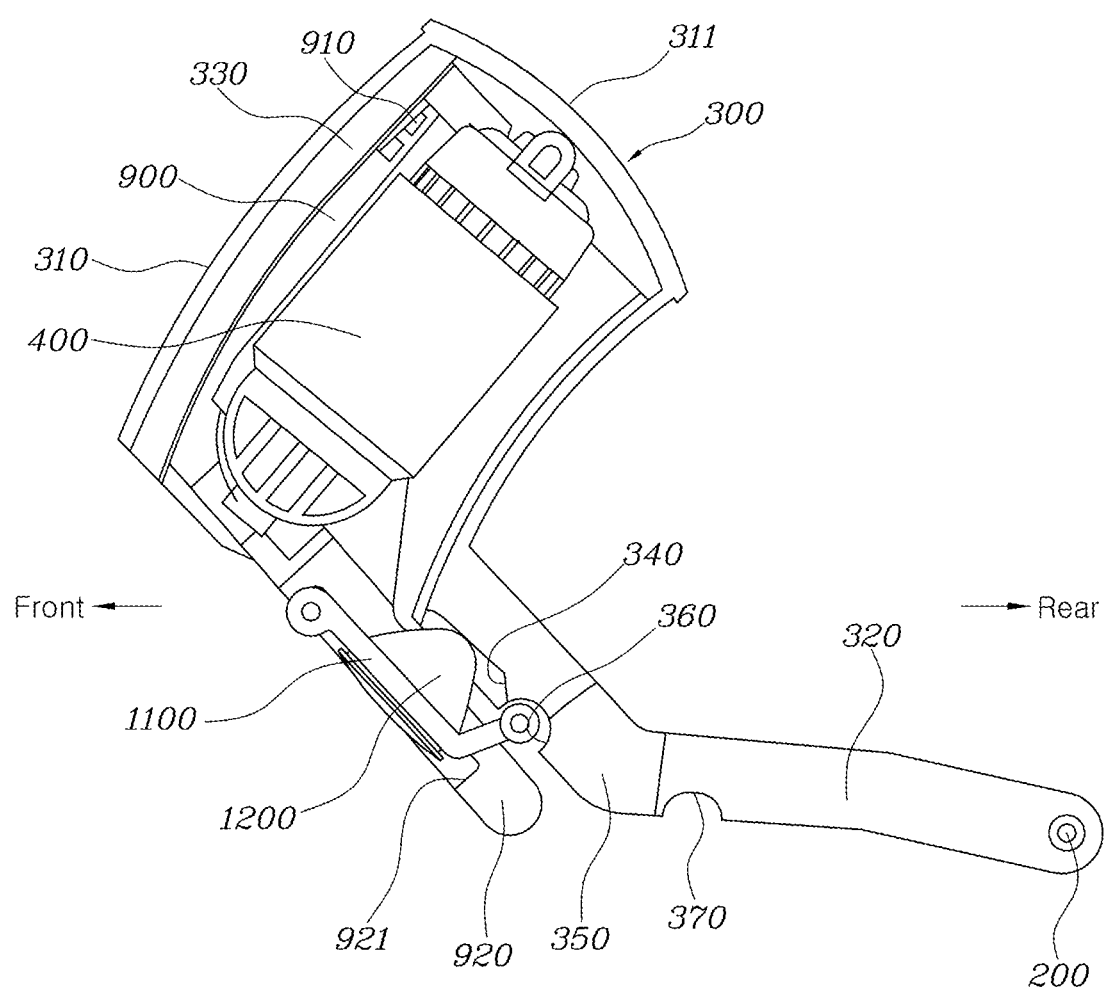

In other words, as the driver operates the pop-up pedal pad 300, when the pedal pad 300 rotates to be inserted into the pedal housing 100, the second end portion of the moving guide 1100 is inserted into the first guide avoidance hole 360 to serve as an avoidance hole preventing interference with the pedal pad 300 (referring to FIG. 13 and FIG. 14).

The first guide avoidance hole 360 is located between the damper contact portion 340 and the damper avoidance hole 350, is extended in left and right directions of the pedal arm portion 320, and has a concave groove shape.

Accordingly, when the pedal pad 300 is hidden by operation of the motors 500 and rotations of the gear device 600 and the rotation stopper 700, the second guide avoidance hole 370 is configured as an avoidance hole into which the second end portion of the moving guide 1100 is inserted to prevent interference with the pedal pad 300 (referring to FIG. 15, FIG. 16 and FIG. 17).

According to an exemplary embodiment of the present disclosure, the foldable pedal apparatus includes a permanent magnet 1300 coupled to the pedal pad 300, and a printed circuit board (PCB) 1400 coupled to the pedal housing 100 to face the permanent magnet 1300. The PCB 1400 detects magnetic flux change of the permanent magnet 1300 in rotation of the pedal pad 300 to generate a signal related to a pedal function, and the signal related to the pedal function is a signal related to braking or a signal related to acceleration.

The permanent magnet 1300 may include a plurality of permanent magnets 1300 and may be located at one side surface of the pedal arm portion 320.

The PCB 1400 may have a function of controlling operation of the motors 500, to the present end, the PCB 1400 and the motors 500 is electrically connected to each other to allow the signal to be transmitted therebetween, and the motors 500 is electrically connected to a power device for operation.

To protect the PCB 1400, the PCB 1400 is configured to be covered with a protecting cover 1500, and the protecting cover 1500 is coupled to a side surface of the pedal housing 100.

FIGS. 15 and 17 are views showing the hidden state in which the pedal pad 300 is inserted into and located in the pedal housing 100 to prevent exposure thereof toward the driver.

When the gear device 600 rotates by operation of the motors 500 and the rotation stopper 700 rotates together with the fourth gear 640 to press the pedal arm portion 320, the pedal pad 300 rotates forward on the hinge pin 200 and thus the pad portion 310 is inserted into the pedal housing 100. Accordingly, as the pad portion 310 is inserted into and located in the pedal housing 100, the pedal pad 300 is hidden so that the pedal pad cannot be operated by the driver.

When the pedal pad 300 is in the hidden state, as a lower space of the driver's seat becomes a wide space without interference with the pedal pad, the driver can take a comfortable rest in a relaxation mode. Furthermore, the misoperation of the pedal in an autonomous driver situation is prevented, so that it is possible to improve safety.

FIG. 2, FIG. 3, FIG. 4, FIG. 5, FIG. 6, FIG. 7, FIG. 8, and FIG. 9 are views showing the pop-up in which the pedal pad 300 protrudes from the inside space of the pedal housing 100 toward the in-vehicle space to be exposed toward the driver.

In the hidden state described above, the gear device 600 rotates reversely by operation of the motors 500, and when the rotation stopper 700 rotates together with the fourth gear 640 and thus the pedal arm portion 320 is released from pressing by the rotation stopper 700, the pedal pad 300 rotates rearward on the hinge pin 200 by the elastic force of the spring module 400 to protrude from the inside space of the pedal housing 100, and thus the pedal pad 300 protrudes and is exposed to the in-vehicle space. Therefore, the pedal pad 300 is pop-up so that the pedal pad may be operated by the driver.

When the gear device 600 rotates to by operation of the motors 500 in the pop-up state described above and the rotation stopper 700 presses the pedal arm portion 320, the pedal pad 300 rotates to be inserted into the pedal housing 100 to be hidden.

As described above, when the gear device 600 rotates by operation of the motors 500 so that the pedal pad 300 rotates to be hidden or pop-up and a position of the permanent magnet 1300 is changed, the PCB 1400 does not generates the signal related to the pedal function to prevent misoperation of the pedal.

FIG. 13 and FIG. 14 are views showing a normal operation state in which the driver operates the pop-up pedal pad 300 by stepping on the pedal pad 300 with the driver's foot so that the pedal pad 300 rotates forward thereof.

As described above, when the pedal pad 300 is in the pop-up state, the driver steps on the protruding pedal pad 300 to perform normal operation.

When the pedal pad 300 is normally operated, the spring module 400, the rubber damper 1200, and a pedal force and hysteresis may be implemented through the hysteresis lever 900.

When the pedal pad 300 rotates forward by operation of driver in the pop-up state, a position of the permanent magnet 1300 is changed, and the PCB 1400 detects magnetic flux change in response to positional change of the permanent magnet 1300 to generate the signal (signal related to acceleration or signal related to braking) related to the pedal function, so that mores stale operation may be induced.

FG. 18 is a view showing the gear device 600 according to various exemplary embodiments of the present disclosure.

According to the various exemplary embodiments of the present disclosure, the gear device 600 includes a plurality of gears to generate a boosting force in a process of transmitting power of the motors 500, the gear device 600 includes at least one worm gear (fifth gear to be described later) and a worm wheel gear (sixth gear to be described later), the worm gear and the worm wheel gear include final reduction gears, and the rotation stopper 700 is coupled to a position eccentric from a rotation center portion of the worm wheel gear.

The reason that the final reduction gears are selected as the worm gear and the worm wheel gear is because the gear ratio increase efficiency is large, so that generation of a boosting force may be induced.

In other words, according to the various exemplary embodiments of the present disclosure, the gear device 600 includes a first gear 661 coupled to the motors 500, a second gear 662 gear-engaged with the first gear 661, a third gear 663 coupled to a rotation center portion of the second gear 662 and rotating integrally with the second gear 662, a fourth gear 664 gear-engaged with the third gear 663, a fifth gear 665 integrated with the fourth gear 664 and rotating with the fourth gear 664, and a sixth gear 666 gear-engaged with the fifth gear 665 and to which the rotation stopper 700 is coupled to the position eccentric from the rotation center portion thereof.

The first gear 661 includes two first gears 661 to be respectively coupled to the motors 500, and the second gear 662 also includes two second gears 662 to be gear-engaged with the first gears 661 one by one.

The first gears 661 ad the second gears 662 include spur gears, and to generate a boosting force, each of the second gears 662 has the number of gear teeth greater than the number of gear teeth of each of the first gears 661 and has PCD formed greater than PCD of the first gear 661.

The third gear 663 and the fourth gear 664 include bevel gears, and to generate a boosting force, the fourth gear 664 has the number of gear teeth greater than the number of gear teeth ad has PCD formed greater than PCD of the third gear 663.

Because the fifth gear 665 is located between two fourth gears 664 and is integrated with the fourth gear 664, the fifth gear 665 includes one fifth gear 665, and the sixth gear 666 gear-engaged with the one fifth gear 665 also includes one sixth gear 666.

The fifth gear 665 and the sixth gear 666 include a worm gear and a worm wheel gear, and to generate a boosting force, the sixth gear 666 has the number of gear teeth greater than the number of gear teeth the fifth gear 665 and has PCD formed greater than PCD of the fifth gear 665.

As described above, the foldable pedal apparatus according to an exemplary embodiment of the present disclosure is configured as follows. In the manual driving mode in which the pedal is operated by the driver by himself or herself, the pedal pad 300 protrudes toward the driver to be exposed (pop-up) so that the driver can operate the pedal apparatus, and in the autonomous driving situation, the pedal pad 300 is hidden and exposure toward the driver is prevented (hidden) so that the driver cannot operate the pedal apparatus. In the autonomous driving situation, the comfortable rest of the driver is possible, and moreover, mis-operation of the pedal apparatus in the autonomous driving situation is prevented, inducing safety improvement.

Furthermore, according to an exemplary embodiment of the present disclosure, the foldable pedal apparatus is configured to generate a boosting force by the gear device 600 transmitting power of the motors 500 to implement the foldable function of the pedal pad 300, so that cost reduction and size reduction may be induced with use of the minimum-capacity motors 500.

Furthermore, according to an exemplary embodiment of the present disclosure, the foldable pedal apparatus is configured to implement the foldable function of the pedal apparatus by rotations of the gear device 600 and the rotation stopper 700 by operation of the motors 500, so that the number of portions may be minimized with the mechanism of the foldable function made as simple as possible, and cost reduction, weight reduction, and layout minimization may be induced.

Furthermore, according to an exemplary embodiment of the present disclosure, the foldable pedal apparatus is the organ type electric pedal apparatus, which has the high-load spring module 400 and the hysteresis lever 900, and the pedal apparatus is configured to change of portions of the hysteresis lever 900. Accordingly, a step force, a stroke, a hysteresis operation force required differently for each vehicle model may be tuned so that cost reduction may be induced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable pedal apparatus for a vehicle, the foldable pedal apparatus comprising:
    a pedal housing;
    a pedal pad rotatably coupled to the pedal housing and configured to move in response to operation of a driver;
    a spring module mounted within the pedal housing and configured to provide an elastic force to the pedal pad so that the pedal pad protrudes from the pedal housing;
    a gear device configured to rotate in receiving power of at least one motor fixed to the pedal housing to generate a boosting force; and
    a rotation stopper coupled to the gear device,
    wherein when the pedal pad rotates in a first direction and is inserted into the pedal housing as the rotation stopper presses the pedal pad by rotation of the gear device, the pedal pad is hidden so that an operation of the pedal pad by the driver in an autonomous driving mode is impossible,
    wherein the pedal housing includes a side cover coupled to the pedal housing to cover an open one portion of the pedal housing,
    wherein the side cover includes a cover groove interrupted with an inside space of the pedal housing,
    wherein the at least one motor and the gear device are located inside the cover groove, and
    wherein the rotation stopper is provided to protrude to the inside space of the pedal housing through the side cover.

2. The foldable pedal apparatus of claim 1, wherein, when pressure of the pedal pad by the rotation stopper is removed by rotation of the gear device and the pedal pad rotates in a second direction by the elastic force of the spring module to protrude from the pedal housing, the pedal pad is pop-up so that an operation of the pedal pad by the driver in a manual driving mode is possible.

3. The foldable pedal apparatus of claim 1, further including:
    a rubber stopper coupled to the pedal housing, wherein when the pedal pad rotates to protrude from the pedal housing, the rubber stopper is provided as a stopper by being in contact with the pedal pad.

4. The foldable pedal apparatus of claim 3,
    wherein the rubber stopper includes a first rubber stopper and a second rubber stopper securely coupled to an internal upper surface of the pedal housing, and
    wherein the first rubber stopper is coupled to a position closer to a rotation center portion of the pedal pad than the second rubber stopper, so that when the pedal pad rotates to protrude from the pedal housing, the first rubber stopper is brought into contact with the pedal pad first and the second rubber stopper is brought into contact with the pedal pad later.

5. The foldable pedal apparatus of claim 4,
    wherein the first rubber stopper is hollow with an empty inside portion to be deformed in contact with the pedal pad to absorb shock and noise, and
    wherein the second rubber stopper is solid with a filled inside portion to perform complete stop of the pedal pad.

6. The foldable pedal apparatus of claim 1, further includes:
    a hysteresis lever rotatably provided with respect to the pedal housing, and of which an upper portion is inserted into the pedal pad and brought into contact with an inside surface of the pedal pad, and generating hysteresis by a friction force with the pedal pad when the pedal pad rotates.

7. The foldable pedal apparatus of claim 6, wherein the pedal pad includes:
    a pad portion including a pad surface to be operated by a foot of the driver, provided so that an end portion of the spring module is inserted thereinto, and brought into contact with the upper portion of the hysteresis lever inserted thereinto; and
    a pedal arm portion, wherein a first end portion of the pedal arm portion is connected to the pad portion and a second end portion of the pedal arm portion is coupled to a hinge pin.

8. The foldable pedal apparatus of claim 7, wherein, in a hidden state of the pedal pad, and in switching from a pop-up state to the hidden state and switching from the hidden state to the pop-up state, the pedal arm portion and the rotation stopper are brought into contact with each other.

9. The foldable pedal apparatus of claim 7, wherein, in a pop-up state of the pedal pad and a state in which the pop-up pedal pad moves in response to operation of the driver and then rotates in the first direction, contact between the pedal arm portion and the rotation stopper is prevented.

10. The foldable pedal apparatus of claim 6, further includes:
    a moving guide including a first end portion inserted into a guide groove formed in the hysteresis lever to be movable along the guide groove and including a second end portion coupled to the gear device through a connection pin, the moving guide moving along the guide groove when the gear device rotates; and a rubber damper coupled to the moving guide, wherein when the pedal pad rotates to be inserted into the pedal housing in a response that the driver operates the pedal pad in a pop-up state, the rubber damper generates a pedal force while being elastically deformed due to contact with the pedal pad.

11. The foldable pedal apparatus of claim 10, wherein the pedal pad has a damper avoidance hole; and wherein when the gear device and the rotation stopper rotate by operation of the at least one motor, and when the pedal pad is inserted into the pedal housing and rotates to be hidden as the rotation stopper presses the pedal pad, the moving guide moves along the guide groove in a direction of protruding from a rod portion, and when the pedal pad is in a hidden state, the rubber damper is inserted in the damper avoidance hole.

12. The foldable pedal apparatus of claim 11, wherein, to prevent the rubber damper from being deformed by the pedal pad when the rubber damper is inserted in the damper avoidance hole, the damper avoidance hole is formed greater than the rubber damper.

13. The foldable pedal apparatus of claim 10, wherein the pedal pad has a damper avoidance hole into which the rubber damper is inserted when the pedal pad is in a hidden state, wherein a first guide avoidance hole is formed at a first side portion of the damper avoidance hole, and when the pedal pad rotates to be inserted into the pedal housing in response to operation of the pop-up pedal pad by the driver, the second end portion of the moving guide is inserted into the first guide avoidance hole to prevent interference with the pedal pad, and wherein a second guide avoidance hole is formed at a second side portion of the damper avoidance hole, and when the pedal pad is hidden, the second end portion of the moving guide is inserted into the second guide avoidance hole to prevent interference with the pedal pad.

14. The foldable pedal apparatus of claim 1, further including:

a permanent magnet coupled to the pedal pad; and a printed circuit board (PCB) coupled to the pedal housing to face the permanent magnet, wherein when the pedal pad rotates, the PCB detects magnetic flux change of the permanent magnet to generate a signal related to a pedal function.

15. The foldable pedal apparatus of claim 14, wherein, when the pedal pad rotates to be hidden or pop-up by rotation of the gear device in response to operation of the at least one motor and a position of the permanent magnet changes, the PCB performs non-generation of the signal related to the pedal function to prevent mis-operation of the foldable pedal apparatus.

16. The foldable pedal apparatus of claim 14, wherein, when the pedal pad is in a pop-up state in which the pedal pad protrudes from the pedal housing and a position of the permanent magnet changes as the pedal pad rotates in the first direction in response to operation of the driver in non-operation of the motor, the PCB is configured to generate the signal related to the pedal function.

17. The foldable pedal apparatus of claim 1, wherein the at least one motor includes at least two motors and each of the at least two motors is a two-way rotational motor configured for rotating clockwise and counterclockwise.

18. The foldable pedal apparatus of claim 1, wherein the gear device includes a plurality of gears to generate the boosting force in a process in which power of the at least one motor is transmitted, wherein the gear device includes at least one worm gear and a worm wheel gear, and wherein the at least one worm gear and the at least one worm wheel gear include final reduction gears and the rotation stopper is coupled to a position eccentric from a rotation center portion of the at least one worm wheel gear.

19. A foldable pedal apparatus for a vehicle, the foldable pedal apparatus comprising:

a pedal housing;

a pedal pad rotatably coupled to the pedal housing and configured to move in response to operation of a driver;

a spring module mounted within the pedal housing and configured to provide an elastic force to the pedal pad so that the pedal pad protrudes from the pedal housing;

a gear device configured to rotate in receiving power of at least one motor fixed to the pedal housing to generate a boosting force;

a rotation stopper coupled to the gear device, wherein when the pedal pad rotates in a first direction and is inserted into the pedal housing as the rotation stopper presses the pedal pad by rotation of the gear device, the pedal pad is hidden so that an operation of the pedal pad by the driver in an autonomous driving mode is impossible; and a rubber stopper coupled to the pedal housing, wherein when the pedal pad rotates to protrude from the pedal housing, the rubber stopper is provided as a stopper by being in contact with the pedal pad, wherein the rubber stopper includes a first rubber stopper and a second rubber stopper securely coupled to an internal upper surface of the pedal housing, and wherein the first rubber stopper is coupled to a position closer to a rotation center portion of the pedal pad than the second rubber stopper, so that when the pedal pad rotates to protrude from the pedal housing, the first rubber stopper is brought into contact with the pedal pad first and the second rubber stopper is brought into contact with the pedal pad later.

20. A foldable pedal apparatus for a vehicle, the foldable pedal apparatus comprising:

a pedal housing;

a pedal pad rotatably coupled to the pedal housing and configured to move in response to operation of a driver;

a spring module mounted within the pedal housing and configured to provide an elastic force to the pedal pad so that the pedal pad protrudes from the pedal housing;

a gear device configured to rotate in receiving power of at least one motor fixed to the pedal housing to generate a boosting force; and a rotation stopper coupled to the gear device, wherein when the pedal pad rotates in a first direction and is inserted into the pedal housing as the rotation stopper presses the pedal pad by rotation of the gear device, the pedal pad is hidden so that an operation of the pedal pad by the driver in an autonomous driving mode is impossible, wherein the gear device includes:

a first gear coupled to the at least one motor;

a second gear gear-engaged with the first gear;

a third gear integrated with the second gear and rotating together with the second gear; and a fourth gear gear-engaged with the third gear and in which the rotation stopper is coupled to a position eccentric from a rotation center portion of the fourth gear, and wherein, to generate the boosting force in a process in which the power of the at least one motor is transmitted from the first gear to the fourth gear, the second gear has a number of gear teeth greater than a number of gear teeth of the first gear and has a pitch circle diameter (PCD) formed greater than a PCD of the first gear, and the fourth gear has a number of gear teeth greater than a number of gear teeth of the third gear and has a PCD formed greater than a PCD of the third gear; the third gear and the fourth gear include a worm gear and a worm wheel gear; and the second gear is integrally coupled to the third gear so that a center portion thereof is located at each of opposite end portions of the third gear.

* * * * *